US012761125B2

(12) United States Patent
Anseth et al.

(10) Patent No.: US 12,761,125 B2
(45) Date of Patent: Oct. 13, 2026

(54) SWELLABLE PHOTOPOLYMERIZED HYDROGELS FOR EXPANSION MICROSCOPY

(71) Applicant: The Regents of the University of Colorado, a body, Denver, CA (US)

(72) Inventors: Kristi Anseth, Boulder, CO (US); Kemal Arda Gunay, Boulder, CO (US); Laura J. Macdougall, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 1036 days.

(21) Appl. No.: 17/906,104

(22) PCT Filed: Mar. 10, 2021

(86) PCT No.: PCT/US2021/021740
§ 371 (c)(1),
(2) Date: Sep. 12, 2022

(87) PCT Pub. No.: WO2021/183667
PCT Pub. Date: Sep. 16, 2021

(65) Prior Publication Data

US 2023/0116191 A1 Apr. 13, 2023

Related U.S. Application Data

(60) Provisional application No. 62/988,026, filed on Mar. 11, 2020.

(51) Int. Cl.

| | |
|---|---|
| ***G01N 1/30*** | (2006.01) |
| ***C08F 2/50*** | (2006.01) |
| ***C08F 290/06*** | (2006.01) |

(52) U.S. Cl.
CPC ................. *G01N 1/30* (2013.01); *C08F 2/50* (2013.01); *C08F 290/062* (2013.01); *G01N 2001/305* (2013.01)

(58) Field of Classification Search
CPC ........................................................ G01N 1/30
See application file for complete search history.

(56) References Cited

U.S. PATENT DOCUMENTS

| | | | |
|---|---|---|---|
| 8,177,892 B2 | 5/2012 | Kase et al. | |
| 9,694,338 B2 | 7/2017 | Murphy et al. | |
| 2004/0242770 A1 | 12/2004 | Feldstein et al. | |
| 2007/0244283 A1 | 10/2007 | Riegel et al. | |
| 2011/0166247 A1 | 7/2011 | Myung et al. | |
| 2013/0176529 A1 | 7/2013 | Li et al. | |
| 2016/0194425 A1* | 7/2016 | Mitra | C08F 220/56 524/56 |
| 2016/0216221 A1 | 7/2016 | Nguyen et al. | |
| 2019/0078985 A1* | 3/2019 | Albrecht | G01N 1/30 |
| 2021/0190652 A1* | 6/2021 | Quevedo | G01N 1/36 |

* cited by examiner

*Primary Examiner* — Michael B. Pallay
(74) *Attorney, Agent, or Firm* — McGaw Law, P.C.; Michael M. McGaw

(57) ABSTRACT

Compositions and methods for preparing and using a swellable polymer network for expansion microscopy (ExM) applications. The swellable polymer network can be prepared on demand using external stimuli for ExM applications. A variety of external stimuli can be employed, including light irradiation, pH, temperature, and magnetic fields. Network preparation using light irradiation is particularly advantageous, as it allows tuned control over the network properties through the variation of time and dose of light irradiation. In other words, light irradiation can be employed with a wavelength and intensity that enables a polymer network formation.

10 Claims, 14 Drawing Sheets

SWELLABLE PHOTOPOLYMERIZED HYDROGELS FOR EXPANSION MICROSCOPY

CROSS-REFERENCE TO RELATED APPLICATIONS

This application claims the benefit of U.S. Provisional Application No. 62/988,026, filed Mar. 11, 2020.

STATEMENT OF GOVERNMENT INTEREST

This invention was made with government support under grant number DE016523 awarded by the National Institutes of Health. The government has certain rights in the invention.

TECHNICAL FIELD OF THE INVENTION

This invention relates to methods and devices for optical imaging of biological samples.

BACKGROUND OF THE INVENTION

Optical imaging of biological samples is essential for the advancement of biology and medicine. However, conventional optical imaging techniques are limited by the diffraction of light, rendering imaging with a resolution below about 200-300 nm not feasible. A variety of super-resolution microscopy techniques have been developed in the last two decades allowing researchers to carry out single molecule super-resolution imaging. However, these techniques often rely on expensive equipment, which are not accessible to everyone. In addition, the techniques can be limited by the thickness of the sample due to optical aberrations and the opacity of biological samples (e.g. tissue sections) that exceed moderate thicknesses. Imaging biological samples of interest in biomaterials used for in vitro culture also suffer from the above-mentioned problems.

Expansion microscopy (ExM) is a sample preparation technique that enables super-resolution imaging. ExM is based on enlarging and optically clearing a sample of interest by embedding the sample into an isotopically swellable hydrogel. ExM enables optically clear, super-resolution imaging of biological specimens using a conventional confocal microscope. The biological specimen could be a 2-dimensional in vitro cell culture matter, as well as intact biological tissue specimens or samples. ExM could be useful for pathology screening, biological hypothesis testing, interrogation of entire tissue samples with single cell/molecule precision, or subcellular RNA localization by allowing direct observation of a specimen of interest rather than resorting to indirect methods of observation. From this point, expansion microscopy allows optically clear, super-resolution imaging of samples using a conventional confocal microscope.

SUMMARY OF THE INVENTION

There is an unmet need for hydrogel formulations that enable precise control over the kinetics and timing of the fabrication, as well as control of the expansion factor of the resulting hydrogels. Prior ExM applications utilize polyelectrolyte hydrogels synthesized by chain polymerization of acrylate-based monomers using a redox initiation system. These hydrogels include a short crosslinker (e.g. N'N'-methylenebisacrylamide or N',N'-dimethylacrylamide), sodium acrylate as the electrolyte monomer, and a redox polymerization initiator system based on ammonium persulfate (APS) or potassium persulfate (KPS) and tetramethylenediamide (TEMED). While robust, 4.5-10.0×expansion can be achieved using these ExM hydrogels, gelation typically requires at least 30-120 minutes depending on the sample. The expanded hydrogels often have reduced mechanical stability. Furthermore, chain polymerizations are prone to inhibition by oxygen, which can alter gel properties in a depth-dependent manner. As a result, ExM of a thick sample typically requires an inert atmosphere (e.g. $N_2$ or Ar).

The present invention provides novel, swellable photopolymerized hydrogels for expansion microscopy, termed “PhotoExM”. Photopolymerization is particularly attractive for expansion microscopy for numerous reasons. PhotoExM allows for precise control over the timing, kinetics, and the location of the polymerization through the controlled illumination of light. This facilitates the control of the cross-linking density, and thus the expansion of these hydrogels by tuning light irradiation. Furthermore, various types of photopolymerization reactions, including but not limited to, thiol-acrylate photopolymerization, have extremely fast kinetics combined with insensitivity to oxygen. This allows high-throughput hydrogel fabrication at ambient conditions. The applicability of PhotoExM hydrogels to enlarge a sample of interest in an extremely rapid but controlled manner at ambient conditions is demonstrated herein. This enables imaging biological cues of interest (e.g. protein, nucleic acids) with super-resolution.

PhotoExM will prove useful for pathology screening, biological hypothesis testing, interrogation of entire tissue samples with single cell/molecule precision, or subcellular RNA localization by allowing direct observation of a specimen of interest rather than resorting to indirect methods of observation.

In addition, we provide methods that enable optical clearing and iterative enlargement of a biomaterial, and the biological sample of interest within, using swellable, photopolymerized hydrogels, in which we refer to as gel-to-gel transfer (GtG). In other words, a sample of interest, or some indicia or marker of that sample, is subjected to multiple rounds of expansion via transfer between hydrogels. Such expansion has the benefit of preserving the relative spatial positioning of the indicia as it undergoes multiple rounds of expansion, thereby preserving information regarding organization of the biomaterial while expanding the biomaterial to a size capable of imaging.

Biomaterials are extensively used as in vitro cell culture systems as relevant physiological models. However, imaging a sample of interest on or in a biomaterial with sufficient intensity and resolution remains challenging owing to attenuation, scattering and absorption of light. Any degradable biomaterial, which can refer to enzymatic, chemical, hydrolytic or photo-degradation, is compatible with GtG. The overall strategy relies on i) homogenous permeation of the photopolymerizable and swellable hydrogel formulation into the biomaterial, ii) photo-polymerizing the hydrogel in situ, while simultaneously or sequentially degrading the biomaterial.

In another embodiment, we provide a method for iterative expansion of a sample of interest using photopolymerizable hydrogels, which enables imaging of biological samples with a resolution less than 30 nm using a conventional optical microscope. As used herein, iterative expansion refers to a cycle of i) polymerization of hydrogel, ii) swelling of a hydrogel, iii) permeating a similar photopolymerizable hydrogel formulation inside the formed hydrogel, iv) polymerizing the second hydrogel while simultaneously transferring the material of the first hydrogel to the second hydrogel, and v) expanding the second hydrogel. The process above can be, in theory, repeated indefinitely, to expand a sample of interest exponentially.

In a first aspect the present invention provides a novel, swellable hydrogel network, along with a composition for producing the swellable hydrogel network. Also provided are methods for the control of the crosslinking density with light to physically enlarge a sample of interest. The hydrogel can be prepared with photoinitiated polymerization. The hydrogel crosslinking density can be controlled by time of light irradiation, intensity of light irradiation, initiator concentration, and concentration of the crosslinking monomer. The hydrogel can be prepared from a selected group of monomers that result in a chain, step or mix-mode polymerization. Examples of such monomers include thiol-ene, thiol-acrylate, acrylate, various click reactions, including photoinitiated copper catalyzed azide/alkyne cycloaddition, amongst many others.

As used herein, chain growth refers to polymerization that proceeds via propagation of an active center (i.e. radical) from one monomer to another, resulting in formation of polymer chains. In step-growth polymerization, multi-arm monomers, which can be either heterofunctional or homofunctional, having complementary reactive groups are used to form a network. The minimum perquisite for the step-growth network formation is when a 3-arm monomer is reacted with a 2-arm monomer, and any combination with more arms would also yield step-growth networks. As used herein, "mixed-mode network" refers to simultaneous step and chain growth of a hydrogel network.

In certain embodiments a hydrogel of the first aspect can be prepared via thiol-acrylate photopolymerization, wherein the network formulation is composed of a photoinitiator, a crosslinking monomer, an electrolyte monomer, a chain transfer agent and a plasticizing monomer. Advantageous photoinitiators include lithium phenyl-2,4,6-trimethylbenzoylphosphinate (LAP), Irgacure 2959, and Eosin Y. "Photoinitiator" as used herein refers to any chemical compound that decomposes into free radicals when exposed to light. Preferably, the photoinitiator produces free radicals when exposed to ultraviolet (UV) or visible light. Examples of photoinitiators include, but are not limited to, 1-[4-(2-hydroxyethoxy)-phenyl]-2-hydroxy-2-methyl-1-propane-1-one (Irgacure 2959, BASF, Florham Park, N.J., USA), azobisisobutyronitrile, benzoyl peroxide, di-tert-butyl peroxide, 2,2-dimethoxy-2-phenylacetophenone, Eosin Y, etc. In some embodiments, the photoinitiator is 1-[4-(2-hydroxyethoxy)-phenyl]-2-hydroxy-2-methyl-1-propane-1-one. In some embodiments, the photoinitiator is Eosin Y. More generally, exemplary photoinitiators include benzophenone, trimethylbenzophenone, thioxanthone, 2-chlorothioxanthone, 9,10-anthraquinone, bis-4,4-dimethylaminobenzophenone, benzoin ethers, benzilketals, α-dialkoxyacetophenones, α-hydroxyalkylphenones, α-amino alkylphenones, acylphosphine oxides, benzophenones/amines, thioxanthones/amines, titanocenes, 2,2-dimethoxy acetophenone, 1-hydroxycyclohexyl phenyl ketone, 2-methyl-1-[4-(methylthio)phenyl]-2-(4-morpholinyl)-1-propanone, 2-hydroxy-1-[4-(hydroxyethoxy)phenyl]-2-methyl-1-propanone, α-hydroxy-ketones and benzilidimethyl-ketals, e.g. Irgacure 651 and 184, and Darocur 1173, marketed by Ciba Chemicals, Rose Bengal, camphorquinone, erythrosine, and mixtures thereof, and so on. In some embodiments, suitable polymerization conditions include wavelengths of light of between about 1 and about 800 nm, such as, between about 200 and about 800 nm, between about 300 and about 650 nm, between about 300 and about 500 nm, between about 300 and about 400 nm, between about 340 and about 370 nm (e.g., about 365 nm), or between about 340 and about 350 nm.

Advantageously, the crosslinking monomer contains at least two polymerizable groups. The polymerizable groups can include, but are not limited to, acrylamide, acrylate, methacrylamide, methacrylate, styrene, vinyl, -ene, norbornene and dibenzocyclooctyne groups. A crosslinking monomer can be poly(ethylene glycol) diacrylamide. The monomer can be an electrolyte monomer composed of at least any one ionic group that can dissociate into positive and negatively charged moieties and a polymerizable group. During application of the swellable hydrogel network, isotropic hydrogel swelling can be promoted by adding water to the hydrogel, leading to ionic dissociation and charge repulsion of the electrolyte monomer. An exemplary electrolyte monomer is sodium acrylate.

The chain transfer agent can be composed of a molecule that can capture radical groups of propagating polymer chains and initiate the propagation of new polymer chains. Any molecule with at least 1-thiol group can be used as a chain transfer agent. Advantageous chain transfer agents include, but are not limited to, 4-arm, 5 kDa poly(ethylene glycol)-thiol, 8-arm, 10 kDa poly(ethylene glycol)-thiol, 4-arm, 2 kDa poly(ethylene glycol)-thiol and 8-arm, 5 kDa poly(ethylene glycol)-thiol.

An advantageous plasticizing monomer is acrylamide.

A solution of the hydrogel composition can be pre-prepared. The solution can include a photoinitiator, a crosslinking polymer, an electrolyte monomer, a chain transfer agent and a plasticizing monomer that can be mixed and stored in the same vial prior to hydrogel preparation. These solutions are typically composed of standard buffers, such as 1×phosphate buffered saline (PBS), which can additionally contain 0-2 M sodium chloride (NaCl). If LAP is used as a photoinitiator, it can be used in an amount between about 0.01% to about 1% by weight. If PEG-diacrylamide is used as the crosslinker monomer, it can be used in an amount between about 0.5 to about 5% by weight. If sodium acrylate is used as the electrolyte monomer, it can be used in an amount of about 16% to about 33% by weight. When 4-arm, 5 kDa PEG-thiol or 8-arm, 10 kDa PEG-thiol are used as the chain transfer agent, it can be used in an amount of about 1% to about 10% by weight. If acrylamide is used as the plasticizing monomer, it can be used in an amount of about 0.1% to about 10% by weight.

Hydrogel formation can be triggered by light irradiation. Where LAP is used as a photoinitiator, light irradiation with a wavelength between about 300 to about 450 nm can be used; preferably between about 365 to about 410 nm. Irradiation time can be between about 20 seconds to about 10 minutes, which can alter the crosslinking density and hydrogel swelling. Preferably, irradiation time will be about 30 seconds to about 2 minutes. Irradiation intensity can be between about 1 to about 50 $mW/cm^2$, which can alter the crosslinking density and hydrogel swelling. Preferably, irradiation intensity will be between about 2.5 to about 10 $mW/cm^2$.

It has been observed that the formed hydrogel can expand between 1.1-10× of its original size (often between 3-7× of its original size) in all dimensions upon dissociation of the electrolyte monomer with immersing the hydrogel into deionized water.

In a second aspect the present invention provides a method for preparing a sample of interest for expansion microscopy, such as through application of the hydrogel composition of the first aspect in its various forms and embodiments. The method can include the steps of fixing a sample of interest; labelling a biological cue of interest within the sample of interest with one or more labelling groups; functionalizing the sample of interest with a tethering group; permeating the sample of interest with a swellable, photopolymerizable hydrogel solution; polymerizing the hydrogel solution via light irradiation, thereby allowing it to embed and tether the sample of interest into the hydrogel network; digesting and removing the sample of interest with a solution using a digestion method that retains and preserves the spatial location of the labelling groups; and expanding the hydrogel network by promoting the dissociation of the electrolyte monomer by water exchange. Following preparation one can image the expanded polymerized hydrogel. As used herein, the term "tethering group" refers to a molecule that can both react with the sample of interest and also contain at least one polymerizable group.

In a third aspect the present invention provides a second method for preparing a sample of interest for expansion microscopy, such as through application of the hydrogel composition of the first aspect in its various forms and embodiments. The method can include the steps of fixing a sample of interest; functionalizing the sample of interest with a tethering group; permeating the sample of interest with the swellable, photopolymerizable hydrogel solution; polymerizing the hydrogel solution via light irradiation, thereby allowing it to embed and tether the sample of interest into the hydrogel network; digesting and removing the sample of interest with a solution using a digestion method that retains and preserves the spatial location of the labelling groups; labelling a biological cue of interest within the sample of interest with labelling groups; and expanding the hydrogel network by promoting the dissociation of the electrolyte monomer by water exchange. Thus, cues of interest can be labelled before hydrogel permeation and photoinitiation, as in the second aspect, or after permeation, as in the third aspect. Following preparation one can image the expanded polymerized hydrogel.

The sample of interest as referred to in the second or third aspect above generally refers to, but is not limited to, a biological, chemical or biochemical sample, such as a cell, array of cells, tumor, tissue, cell isolate, biochemical assembly, or a distribution of molecules suitable of microscopic analysis.

The biological cue of interest can be a protein and labelling groups to detect biological cue of interest such as a primary antibody for a protein of interest followed by the secondary antibody-fluorophore conjugate, a primary antibody-fluorophore conjugate for a protein of interest, a primary antibody for a protein of interest followed by the secondary antibody-biotin or secondary antibody-horseradish peroxidase (HRP) conjugate, a primary antibody-biotin or primary antibody-horseradish peroxidase conjugate for a protein of interest, a primary or secondary antibody for a protein of interest functionalized with a nucleotide group, a primary or secondary antibody for a protein of interest functionalized with a reactive moiety participating in a click reaction, Herein, click reactions are selected from a copper-click azide alkyne chemistries, strain-promoted azide alkyne cycloadditions and Diels-Alder type reactions. These groups can include, but are not limited to, azide, alkyne, strained alkyne, tetrazine, norbornene, trans-cyclooctene, cyclopentadiene, furan and maleimide groups.

In further aspects the biological cue of interest can be a nucleic acid. The labelling groups to detect the nucleic acid biological cue of interest can include a fluorophore-conjugated complementary nucleic acid sequence.

The tethering group of the second or third aspect can be, but is not limited to, succinimidyl ester of 6-((acryloyl) amino)hexanoic acid (AcX), succinimidyl ester of 6-((acryloyl)amino)thiol or Traut's reagent. The sample of interest can be treated with 0.01-10 mg/mL of the tethering groups; preferably 0.1-1 mg/mL in a buffered aqueous solution, such as PBS for 0.1-48 hours, preferably 2-24 hours. In further embodiments the tethering group can be Label-X, which is obtained by reacting commercially available Label-IT amine (Mirus Biologicals) with succinimidyl ester of 6-((acryloyl) amino)hexanoic acid (AcX) overnight at room temperature using previously established protocols [Chen, F. et al. Nanoscale imaging of RNA with expansion microscopy. *Nat. Methods* 13, 679-684 (2016)]

In methods according to the second or third aspect, permeation of the hydrogel solution can be carried out in about 5 minutes to about 24 hours; preferably permeation is carried out in about 10 to about 30 minutes depending on the nature and the thickness of the sample of interest. The polymerization of hydrogel solution can be achieved via light irradiation.

As discussed above, hydrogel formation can be triggered by light irradiation. Where LAP is used as a photoinitiator, light irradiation with a wavelength between about 300 to about 450 nm can be used; preferably between about 365 to about 410 nm. Irradiation time can be between about 20 seconds to about 10 minutes, which can alter the crosslinking density and hydrogel swelling. Preferably, irradiation time will be about 30 seconds to about 2 minutes. Irradiation intensity can be between about 1 to about 50 $mW/cm^2$, which can alter the crosslinking density and hydrogel swelling. Preferably, irradiation intensity will be between about 2.5 to about 10 $mW/cm^2$.

In methods according to the second or third aspect, the digestion can be a physical, chemical or enzymatic disruption of the sample. Specific examples of digestion can include, but are not limited to, LysC protease, autoclaving, or proteinase K digestion. The digestion can be carried out between 6-72 hours; more preferably between 16-48 hours. Digestion will generally proceed until an optically clear sample is obtained. Expansion of the hydrogel network can be performed by promoting the dissociation of the electrolyte monomer by water exchange. The formed hydrogel can expand between 1.1-10× of its original size (often between 3-7× of its original size) in all dimensions upon dissociation of the electrolyte monomer with immersing the hydrogel into deionized water.

A non-fluorescent label can be used in the labelling step, with fluorescent labelling of the sample of interest following the expansion step. For example, if a biotin-functionalized antibody is used before expansion, a fluorophore-conjugated streptavidin can be employed to introduce a fluorophore after the expansion. If an antibody functionalized with a clickable group is used before expansion, a fluorophore conjugated complementary group can be employed to introduce a fluorophore after the expansion. The clickable complementary groups can include, but are not limited to, azide-alkyne, azide-strained alkyne, tetrazine-norbornene, tetrazine-transcyclooctene, furan-maleimide, cyclopentadiene-maleimide groups. If an HRP-functionalized antibody is used before expansion, a fluorophore-conjugated tyramide can be employed to introduce a fluorophore after the expansion with the introduction of hydrogen peroxide. Lastly, by way of nonlimiting examples, if a nucleotide functionalized antibody is used before expansion, its complementary sequence functionalized with a fluorophore can be employed to introduce a fluorophore after the expansion.

In a fourth aspect the present invention provides a method of clearing and physically enlarging a biomaterial containing cells or other biologics used to culture and grow biological specimen in vitro. The method can include permeating the biomaterial with a swellable, photopolymerizable hydrogel solution, polymerizing of the hydrogel solution by exposing the solution to light irradiation, degrading/digesting the original biomaterial with an agent that removes the sample biomaterial while retaining the photopolymerized hydrogel, and expanding the hydrogel network by promoting the dissociation of the electrolyte monomer by water exchange. In advantageous embodiments the method according to the fourth aspect will be practiced using a starting biomaterial that is degradable and/or digestible. For example, it is contemplated that the method can be practiced using a biomaterial that can be degraded enzymatically, hydrolytically, chemically or by the application of light. Biomaterials that can be enzymatically degradable include (1) natural proteins/polymers based on materials that can be digested with a suitable enzyme, including, but not limited to, Matrigel and its derivatives, collagen, gelatin, fibronectin, vitronectin, alginate, fibrin, silk, elastin, decellularized tissue, amongst many others, in which when the suitable enzyme is applied, complete dissolution of the hydrogel takes place; and (2) synthetic hydrogels containing proteolytically degradable monomers such as matrix-metalloproteinase (MMP) degradable peptide sequences, elastin degradable sequences, in which when the suitable enzyme is applied resulting in complete dissolution of the hydrogel.

In certain embodiments the method of the fourth aspect can be practiced on a hydrolytically degradable biomaterial, such as one containing functional groups that can be completely dissolved in aqueous environments. Examples of these functional groups can include, but are not limited to, ester group, thioester groups, acrylate groups, methacrylate groups, hydrazone groups, oxime groups, amongst many others.

In certain embodiments the method of the fourth aspect can be practiced on a chemically degradable biomaterial that can be completely dissolved once treated with a molecule that can cleave the covalent bonds of the biomaterial. The molecule-covalent bond pairs that can be used include, but are not limited to, glutathione-disulfude bonds, TCEP-disulfidebonds, DTT, disulfide bonds, borohydride-hydrazone bonds, borohydride-imine bonds, thiol-thioester bonds, amongst many others.

In still further embodiments the method of the fourth aspect can be practiced on a light-degradable biomaterial, wherein the biomaterial has photodegradable bonds that can be cleaved upon light irradiation, resulting in the complete dissolution of the biomaterial. Examples of the photodegradable bonds include o-nitrobenzyl groups, coumarin groups, disulfide groups, allyl sulfide groups, anthracene groups, amongst many others.

Methods according to the fourth aspect can be practiced with swellable, photopolymerizable hydrogel solutions including those as described in the first aspect, above. Permeation using the hydrogel solution can be carried out over a period of about 5 minutes to about 24 hours. Preferably, permeation using the hydrogel solution can be carried out over a period of about 10 minutes to about 6 hours. The length of time for permeation depends upon factors including the nature and the thickness of the biomaterial that is being permeated.

Hydrogel formation/polymerization can be triggered by light irradiation. Where LAP is used as a photoinitiator, light irradiation with a wavelength between about 300 to about 450 nm can be used; preferably between about 365 to about 410 nm. Irradiation time can be between about 20 seconds to about 10 minutes, which can alter the crosslinking density and hydrogel swelling. Preferably, irradiation time will be about 30 seconds to about 2 minutes. Irradiation intensity can be between about 1 to about 50 $mW/cm^2$, which can alter the crosslinking density and hydrogel swelling. Preferably, irradiation intensity will be between about 2.5 to about 10 $mW/cm^2$.

Expansion of the hydrogel network of the fourth aspect can be performed by promoting the dissociation of the electrolyte monomer by water exchange. The formed hydrogel can expand between 1.1-10× of its original size (often between 3-7× of its original size) in all dimensions upon dissociation of the electrolyte monomer with immersing the hydrogel into deionized water.

The biomaterial can be used to culture and/or grow or incorporate a sample of interest, including but not limited to biological, chemical or biochemical sample, such as a cell, array of cells, tumor, tissue, cell isolate, biochemical assembly, or a distribution of molecules suitable of microscopic analysis.

The method according to the fourth aspect can be practiced with a sample of interest that is cultured, grown or incorporated in or on a biomaterial and can be used to prepare a sample for expansion microscopy. In certain embodiments the method according to the fourth aspect can include the steps of labelling a biological cue of interest within the sample of interest with labelling groups, functionalizing the sample of interest with a tethering group, permeating the sample of interest with the swellable, photopolymerizable hydrogel solution, polymerizing the hydrogel solution via light irradiation, which allows to embed and tether the sample of interest into the hydrogel network, digesting and removing the sample of interest either simultaneously or sequentially with the biomaterial, but by retaining and preserving the spatial location of the labelling group, and expanding the hydrogel network by promoting the dissociation of the electrolyte monomer by water exchange. The resulting expanded polymerized hydrogel can then be imaged with microscopy.

The biological cue of interest can be a protein and labelling groups to detect biological cue of interest such as a primary antibody for a protein of interest followed by the secondary antibody-fluorophore conjugate, a primary antibody-fluorophore conjugate for a protein of interest, a primary antibody for a protein of interest followed by the secondary antibody-biotin or secondary antibody-horseradish peroxidase (HRP) conjugate, a primary antibody-biotin or primary antibody-horseradish peroxidase conjugate for a protein of interest, a primary or secondary antibody for a protein of interest functionalized with a nucleotide group, a primary or secondary antibody for a protein of interest functionalized with a reactive moiety participating in a click reaction, Herein, click reactions are selected from a copper-click azide alkyne chemistries, strain-promoted azide alkyne cycloadditions and Diels-Alder type reactions. These groups can include, but not limited to, azide, alkyne, strained alkyne, tetrazine, norbornene, trans-cyclooctene, cyclopentadiene, furan and maleimide groups.

In further aspects the biological cue of interest can be a nucleic acid. The labelling groups to detect the nucleic acid biological cue of interest can include a fluorophore conjugated complementary nucleic acid sequence.

The tethering group of the fourth aspect can be, but is not limited to, succinimidyl ester of 6-((acryloyl)amino) hexanoic acid (AcX), succinimidyl ester of 6-((acryloyl) amino)thiol or Traut's reagent. The sample of interest can be treated with 0.01-10 mg/mL of the tethering groups; preferably 0.1-1 mg/mL in a buffered aqueous solution, such as PBS for 0.1-48 hours, preferably 2-24 hours. In further embodiments the tethering group can be Label-X, which is obtained by reacting commercially available Label-IT amine (Mirus Biologicals) with succinimidyl ester of 6-((acryloyl) amino)hexanoic acid (AcX) overnight at room temperature using previously established protocols [Chen, F. et al. Nanoscale imaging of RNA with expansion microscopy. *Nat. Methods* 13, 679-684 (2016)].

In methods according to the fourth aspect, permeation of the hydrogel solution can be carried out in about 5 minutes to about 24 hours; preferably permeation is carried out in about 10 to about 30 minutes depending on the nature and the thickness of the sample of interest. The polymerization of hydrogel solution can be achieved via light irradiation.

In certain embodiments the biological cue of interest can be a protein or a nucleic acid.

In a fifth aspect the present invention provides a method wherein the sample of interest is cultured, grown or incorporated in or on a biomaterial that can be used to prepare a sample for expansion microscopy. The method can include the steps of fixing a sample of interest, functionalizing the sample of interest with a tethering group, permeating the sample of interest with the swellable, photopolymerizable hydrogel solution, polymerizing the hydrogel solution via light irradiation, which allows to embed and tether the sample of interest into the hydrogel network, digesting and removing the sample of interest either simultaneously or sequentially with the biomaterial, labelling the biological cue of interest within the sample of interest with labelling groups, expanding the hydrogel network by promoting the dissociation of the electrolyte monomer by water exchange. The resulting expanded polymerized hydrogel can then be imaged with microscopy. The sample of interest can include a biological cue of interest that is a nucleic acid.

The tethering group of the fifth aspect can be, but is not limited to, succinimidyl ester of 6-((acryloyl)amino) hexanoic acid (AcX), succinimidyl ester of 6-((acryloyl) amino)thiol or Traut's reagent. The sample of interest can be treated with 0.01-10 mg/mL of the tethering groups; preferably 0.1-1 mg/mL in a buffered aqueous solution, such as PBS for 0.1-48 hours, preferably 2-24 hours. In further embodiments the tethering group can be Label-X, which is obtained by reacting commercially available Label-IT amine (Mirus Biologicals) with succinimidyl ester of 6-((acryloyl) amino)hexanoic acid (AcX) overnight at room temperature using previously established protocols [Chen, F. et al. Nanoscale imaging of RNA with expansion microscopy. *Nat. Methods* 13, 679-684 (2016)].

In further aspects the biological cue of interest can be a nucleic acid. The labelling groups to detect the nucleic acid biological cue of interest can include a fluorophore conjugated complementary nucleic acid sequence.

In methods according to fifth aspect, permeation of the hydrogel solution can be carried out in about 5 minutes to about 24 hours; preferably permeation is carried out in about 10 to about 30 minutes depending on the nature and the thickness of the sample of interest. The polymerization of hydrogel solution can be achieved via light irradiation.

Hydrogel formation can be triggered by light irradiation. Where LAP is used as a photoinitiator, light irradiation with a wavelength between about 300 to about 450 nm can be used; preferably between about 365 to about 410 nm. Irradiation time can be between about 20 seconds to about 10 minutes, which can alter the crosslinking density and hydrogel swelling. Preferably, irradiation time will be about 30 seconds to about 2 minutes. Irradiation intensity can be between about 1 to about 50 $mW/cm^2$, which can alter the crosslinking density and hydrogel swelling. Preferably, irradiation intensity will be between about 2.5 to about 10 $mW/cm^2$.

It has been observed that the formed hydrogel can expand between 1.1-10× of its original size (often between 3-7× of its original size) in all dimensions upon dissociation of the electrolyte monomer with immersing the hydrogel into deionized water.

In methods according to the fifth aspect, the digestion can be a physical, chemical or enzymatic disruption of the sample. If the biomaterial is enzymatically degradable, digestion of the sample of interest and the degradation of the biomaterial can be carried out simultaneously by using, but not limited to, LysC protease and proteinase K. Specific examples of digestion can include, but are not limited to, LysC protease, autoclaving, or proteinase K digestion. The digestion can be carried out between about 6 to about 72 hours; more preferably between about 16 to about 48 hours. Digestion will generally proceed until an optically clear sample is obtained. Expansion of the hydrogel network can be performed by promoting the dissociation of the electrolyte monomer by water exchange. The formed hydrogel can expand between 1.1-10× of its original size (often between 3-7× of its original size) in all dimensions upon dissociation of the electrolyte monomer with immersing the hydrogel into deionized water. In an advantageous embodiment, if the biomaterial is photodegradable, the biomaterial can be simultaneously degraded while polymerizing the photopolymerizable hydrogel solution, particularly where both processes can take place at similar wavelengths of light irradiation.

If the biomaterial is degradable chemically or hydrolytically, biomaterial can be either degraded before or after the digestion of the sample of interest. If the biomaterial is hydrolytically degradable, it can be immersed in an acidic (pH 0-6) or basic (pH 8-14) aqueous solution for about 10 minutes to about 72 hours; preferably between about 10 minutes to about 24 hours to degrade the biomaterial. If the biomaterial is chemically degradable, it can be treated with a molecule that can cleave the covalent bond, in which pairs of these molecules-covalent bonds such as were described with respect to prior aspects of the invention. Degradation can be performed for about 10 minutes to about 72 hours; preferably between about 10 minutes and about 24 hours to degrade the biomaterial.

In a sixth aspect the present invention provides a method of physically enlarging a sample of interest iteratively by using swellable hydrogel networks that are prepared, or pre-prepared, and wherein the material of interest is transferred from one swellable hydrogel network to another while maintaining the spatial location of a sample or a representative indicia of that sample and wherein polymerization and/or degradation of successive hydrogels can be achieved using light (i.e. for polymerization and/or degradation in either a sequential or simultaneous manner). In other words, the sample of interest can be subjected to multiple rounds of expansion by repeated expansion in a hydrogel or hydrogels, wherein a hydrogel used in a prior round of expansion is digested after a new hydrogel solution is applied and polymerized. Once the hydrogel from the prior round has been removed, the newly polymerized hydrogel can be expanded. In an advantageous embodiment, the hydrogels used in the successive rounds of expansion are prepared by photoinitiated polymerization.

In an advantageous embodiment the hydrogel network(s) contains a transfer group. Transfer groups can undergo a reversible exchange reaction with one of the components of the hydrogel. This allows for the transfer the material/sample/indicia of interest of a first hydrogel to a second hydrogel, while preserving the spatial position of the material/sample/indicia of interest. In a particularly advantageous embodiment the transfer group is an allyl sulfide group.

In the various methods taught herein the hydrogel crosslinking density can be controlled by altering time of light irradiation, the intensity of light irradiation, and the concentration of the photoinitiator.

The hydrogel can be prepared from a selected group of monomers that result in a chain, step or mix-mode polymerization. Examples of such monomers include thiol-ene, thiol-acrylate, acrylate, various click reactions including photoinitiated copper catalyzed azide/alkyne cycloaddition, amongst many others.

In step-growth polymerization, multi-arm monomers, which can be either heterofunctional or homofunctional, having complementary reactive groups are used to form a network. The minimum perquisite for the step-growth network formation is when a 3-arm monomer is reacted with a 2-arm monomer, and any combination with more arms would also yield step-growth networks. As used herein, "mixed-mode network" refers to simultaneous step and chain growth of a hydrogel network.

In certain embodiments the hydrogel formulation of the sixth aspect can be composed of a photoinitiator, a crosslinking monomer, an electrolyte monomer, a chain transfer agent, a plasticizing monomer, and an allyl sulfide transfer group. Nonlimiting examples of allyl sulfide containing molecules that can be used as transfer agents are allyl sulfide $PEG_3$ bis(azide), allyl sulfide $PEG_3$ bis(alcohol), 2-methylene-propane-1,3-di(thioethyl vinyl ether), 2-Methyl-propane-1,3-di(thioethyl vinyl ether), amongst many others. A solution of the hydrogel composition comprising the photoinitiator, the crosslinking polymer, the electrolyte monomer, the chain transfer agent, the plasticizing monomer and the transfer group can be mixed and stored in the same vial prior to hydrogel preparation (e.g. it can be pre-prepared and stored for future use for at least 2 hours at room temperature). It is contemplated that one can premix the hydrogel formulation, aliquot fractions, store at −20° or −80° C. for extended periods of time (e.g. 8 hours, 12 hours, 1 day, 3 days, 1 week, 2 weeks, 1 month, 2 months, 3 months, 4 months, or 6 months), and thaw only before the application. It should prove stable for several months at −20 or −80 C. One key is that the polymerization in PhotoExM can only start upon light irradiation, which enables premixing, whereas in previous technologies, polymerization starts immediately upon mixing all hydrogel components, which significantly complicates the design and handling.

These hydrogel solutions are typically composed of standard buffers, such as 1× phosphate buffered saline (PBS), which can additionally contain 0-2 M sodium chloride (NaCl).

If LAP is used as a photoinitiator, it can be used in an amount between about 0.01% to about 1% by weight. If PEG-diacrylamide is used as the crosslinker monomer, it can be used in an amount between about 0.5 to about 5% by weight. If sodium acrylate is used as the electrolyte monomer, it can be used in an amount of about 16% to about 33% by weight. When 4-arm, 5 kDa PEG-thiol or 8-arm, 10 kDa PEG-thiol are used as the chain transfer agent, it can be used in an amount of about 1% to about 10% by weight. If acrylamide is used as the plasticizing monomer, it can be used in an amount of about 0.1% to about 10% by weight. If allyl sulfide is used as the transfer group it can be used in an amount of 0.1% to 5% by weight.

The allyl sulfide transfer monomer and the chain transfer agent can be reacted in the presence of the light and the photoinitiator before mixing with the other components of the hydrogel and then subsequently mixed with the photoinitiator, crosslinking monomer, electrolyte monomer and the plasticizing monomer. This enables in situ incorporation of the allyl sulfide group to the hydrogel network. This reaction can be carried out by using 1-100 mM of the allyl sulfide group and 1-25% of the chain transfer agent by weight. If LAP is used as the photoinitiator, 0.01-10% of LAP can be used in a wavelength between 300-450 nm, more preferably between 365-410 nm. Irradiation time can be between about 10 seconds to about 10 minutes; preferably for about 10 seconds to about 1 minute. Irradiation intensity can be between 1-50 $mW/cm^2$; preferably between about 2.5 to about 10 $mW/cm^2$. As above, the hydrogel formation can be triggered by light irradiation. If LAP is used as a photoinitiator, light irradiation with a wavelength between about 300 to about 450 nm can be used; preferably between about 365 to about 410 nm. Irradiation time can be between about 20 seconds to about 10 minutes, which can alter the crosslinking density and hydrogel swelling. Preferably irradiation time can be between about 30 seconds to about 2 minutes. Irradiation intensity can be between about 1 to about 50 $mW/cm^2$, which can alter the crosslinking density and hydrogel swelling. Preferably, irradiation intensity can be between about 2.5 to about 10 $mW/cm^2$. It has been observed that the formed hydrogel can expand between 1.1-10× of its original size (often between 3-7× of its original size) in all dimensions upon dissociation of the electrolyte monomer with immersing the hydrogel into deionized water.

The formed hydrogel can be permeated with the hydrogel solution (as described in various aspects in this summary) after expansion of the formed hydrogel, and upon light irradiation, its network components can be transferred to new hydrogel by preserving their spatial position owing to the exchange reaction between the thiol and allyl sulfide groups, which forms new allyl sulfide groups. This hydrogel can expand between 1.1-10× of its original size, and more specifically between 3-7× of its original size in all dimensions upon dissociation of the electrolyte monomer with immersing the hydrogel into deionized water.

The method according to sixth aspect can be repeated iteratively, enabling an overall expansion of $1.1^n$-$10^n$×, and more specifically between $3^n$-$7^n$×, in which n denotes the number of times that the method has been repeated.

Hydrogels produced according to methods such as those disclosed herein can be used to prepare a sample of interest for iterative expansion microscopy. In a seventh aspect, such methods are taught herein. The method for iterative expansion can include the steps of (i) fixing a sample of interest, (ii) labelling a biological cue of interest within the sample of interest with labelling groups (such as disclosed above in this summary), (iii) functionalizing the sample of interest with a tethering group, (iv) permeating the sample of interest with the swellable, photopolymerizable hydrogel solution that also contains a transfer group as described in the sixth aspect, for example, (v) polymerizing the hydrogel solution via light irradiation, which allows to embed and tether the sample of interest into the hydrogel network, (vi) digesting and/or removing the sample of interest with a solution that retains/preserves the spatial location of the labelling groups, (vii) expanding the hydrogel network by promoting the dissociation of the electrolyte monomer by water exchange, (viii) permeating the hydrogel network with a swellable, photopolymerizable hydrogel solution, (ix) polymerizing the hydrogel solution again, which allows transferring the spatial location of the first hydrogel network as well as the spatial location of the labelling groups, (x) expanding the hydrogel network again by promoting the dissociation of the electrolyte monomer by water exchange. Steps (vi)-(x) can be repeated a plurality of times (e.g. two or more times, three or more times, four or more times, five or more times, six or more times; theoretically indefinitely). Following preparation one can image the expanded polymerized hydrogel.

In an eighth aspect the present invention provides further methods wherein the hydrogels can be used to prepare a sample of interest for expansion microscopy. The method according to the eighth aspect can include the steps of (i) fixing a sample of interest, (ii) functionalizing the sample of interest with a tethering group, (iii) permeating the sample of interest with the swellable, photopolymerizable hydrogel solution that also contains a transfer group as described in the sixth aspect, for example, (iv) polymerizing the hydrogel solution via light irradiation, which allows one to embed and tether the sample of interest into the hydrogel network, (v) digesting and/or removing the sample of interest with a solution that retains/preserves the spatial location of the labelling groups, (vi) expanding the hydrogel network by promoting the dissociation of the electrolyte monomer by water exchange, (vii) permeating the hydrogel network with a swellable, photopolymerizable hydrogel solution, (viii) polymerizing the hydrogel solution again, which allows transferring the spatial location of the first hydrogel network as well as the spatial location of the labelling groups, (ix) expanding the hydrogel network again by promoting the dissociation of the electrolyte monomer by water exchange, and (x) labelling a biological cue of interest within the sample of interest with labelling groups. Steps (v)-(ix) can be repeated a plurality of times (e.g. two or more times, three or more times, four or more times, five or more times, six or more times; theoretically indefinitely). Following preparation one can image the expanded polymerized hydrogel.

Hydrogels according to various aspects of the inventions (e.g. compositions and methods) can be prepared via thiol-acrylate photopolymerization, wherein the network formulation is composed of a photoinitiator, crosslinking monomer, electrolyte monomer, chain transfer agent and plasticizing monomer. Advantageous photoinitiators include lithium phenyl-2,4,6-trimethylbenzoylphosphinate (LAP), Irgacure 2959, and Eosin Y. Preferably, the photoinitiator produces free radicals when exposed to ultraviolet (UV) or visible light. Examples of photoinitiators include, but are not limited to, 1-[4-(2-hydroxyethoxy)-phenyl]-2-hydroxy-2-methyl-1-propane-1-one (Irgacure 2959, BASF, Florham Park, N.J., USA), azobisisobutyronitrile, benzoyl peroxide, di-tert-butyl peroxide, 2,2-dimethoxy-2-phenylacetophenone, Eosin Y, etc. In some embodiments, the photoinitiator is 1-[4-(2-hydroxyethoxy)-phenyl]-2-hydroxy-2-methyl-1-propane-1-one. In some embodiments, the photoinitiator is Eosin Y. More generally, exemplary photoinitiators include benzophenone, trimethylbenzophenone, thioxanthone, 2-chlorothioxanthone, 9,10-anthraquinone, bis-4,4-dimethylaminobenzophenone, benzoin ethers, benzilketals, α-dialkoxyacetophenones, α-hydroxyalkylphenones, α-amino alkylphenones, acylphosphine oxides, benzophenones/amines, thioxanthones/amines, titanocenes, 2,2-dimethoxy acetophenone, 1-hydroxycyclohexyl phenyl ketone, 2-methyl-1-[4-(methylthio)phenyl]-2-(4-morpholinyl)-1-propanone, 2-hydroxy-1-[4-(hydroxyethoxy)phenyl]-2-methyl-1-propanone, α-hydroxy-ketones and benzilidimethyl-ketals, e.g. Irgacure 651 and 184, and Darocur 1173, marketed by Ciba Chemicals, Rose Bengal, camphorquinone, erythrosine, and mixtures thereof, and so on. In some embodiments, suitable polymerization conditions include wavelengths of light of between about 1 and about 800 nm, such as, between about 200 and about 800 nm, between about 300 and about 650 nm, between about 300 and about 500 nm, between about 300 and about 400 nm, between about 340 and about 370 nm (e.g., about 365 nm), or between about 340 and about 350 nm.

Advantageously, the crosslinking monomer contains at least two polymerizable groups. The polymerizable groups can include, but are not limited to, acrylamide, acrylate, methacrylamide, methacrylate, styrene, vinyl, -ene, norbornene and dibenzocyclooctyne groups. A crosslinking monomer can be poly(ethylene glycol) diacrylamide. The monomer can be an electrolyte monomer composed of at least any one ionic group that can dissociate into positive and negatively charged moieties and a polymerizable group. During application of the swellable hydrogel network, isotropic hydrogel swelling can be promoted by adding water to the hydrogel, leading to ionic dissociation and charge repulsion of the electrolyte monomer. An exemplary electrolyte monomer is sodium acrylate.

The chain transfer agent can be composed of a molecule that can capture radical groups of propagating polymer chains and initiate the propagation of new polymer chains. Any molecule with at least 1-thiol group can be used as a chain transfer agent. Advantageous chain transfer agents include, but are not limited to, 4-arm, 5 kDa poly(ethylene glycol)-thiol, 8-arm, 10 kDa poly(ethylene glycol)-thiol, 4-arm, 2 kDa poly(ethylene glycol)-thiol and 8-arm, 5 kDa poly(ethylene glycol)-thiol. An advantageous plasticizing monomer is acrylamide.

A solution of the hydrogel composition can be prepared. The solution can include a photoinitiator, a crosslinking polymer, an electrolyte monomer, a chain transfer agent and a plasticizing monomer that can be mixed and stored in the same vial prior to hydrogel preparation. These solutions are typically composed of standard buffers, such as 1× phosphate buffered saline (PBS), which can additionally contain 0-2 M sodium chloride (NaCl). If LAP is used as a photoinitiator, it can be used in an amount between about 0.01% to about 1% by weight. If PEG-diacrylamide is used as the crosslinker monomer, it can be used in an amount between about 0.5 to about 5% by weight. If sodium acrylate is used as the electrolyte monomer, it can be used in an amount of about 16% to about 33% by weight. When 4-arm, 5 kDa PEG-thiol or 8-arm, 10 kDa PEG-thiol are used as the chain transfer agent, it can be used in an amount of about 1% to about 10% by weight. If acrylamide is used as the plasticizing monomer, it can be used in an amount of about 0.1% to about 10% by weight.

Hydrogel formation can be triggered by light irradiation. Where LAP is used as a photoinitiator, light irradiation with a wavelength between about 300 to about 450 nm can be used; preferably between about 365 to about 410 nm. Irradiation time can be between about 20 seconds to about 10 minutes, which can alter the crosslinking density and hydrogel swelling. Preferably, irradiation time will be about 30 seconds to about 2 minutes. Irradiation intensity can be between about 1 to about 50 mW/cm$^2$, which can alter the crosslinking density and hydrogel swelling. Preferably, irradiation intensity will be between about 2.5 to about 10 mW/cm$^2$.

BRIEF DESCRIPTION OF THE DRAWINGS

For a fuller understanding of the invention, reference should be made to the following detailed description, taken in connection with the accompanying drawings, in which.

& Hubbell, J. A. Enhanced proteolytic degradation of molecularly engineered PEG hydrogels in response to MMP-1 and MMP-2. *Biomaterials* 31, 7836-7845 (2010)] (B) Fluorescence intensity scans and the Gaussian approximations of the lines drawn on (A) illustrating that GtG allows one to resolve the average diameter of the nuclear lamina canals, which are not resolvable before expansion.

Figure 11:
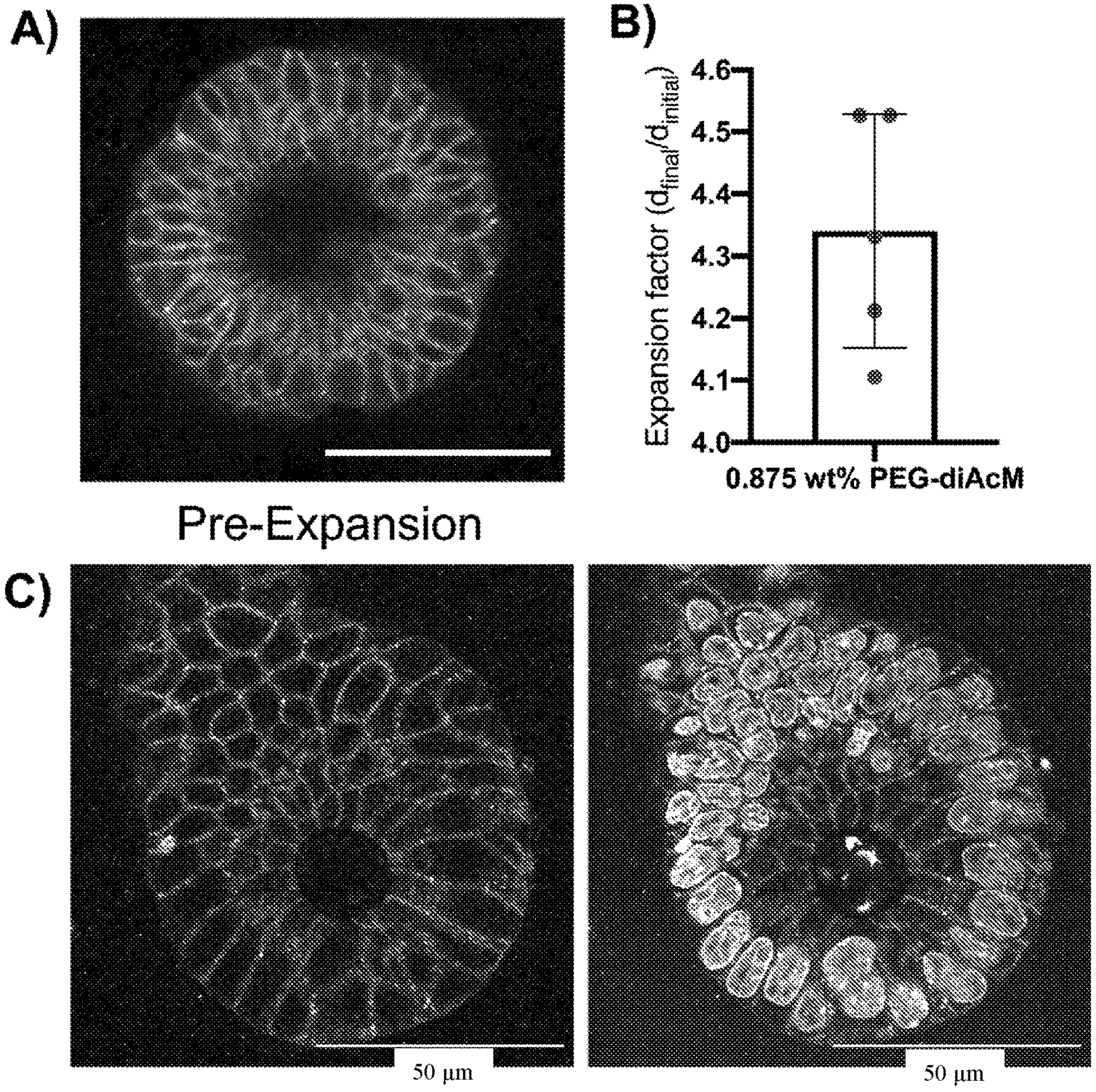

FIG. 11 is a set of three images and a plot. (A) Representative image of E-cadherin immunolabeled intestinal organoids with apical-basal polarity that were grown in Matrigel. Scale bar=50 μm. (B) Average expansion factor of PhotoExM hydrogels permeated and polymerized in Matrigel, in which the error bar represents the standard deviation of the measurements. (C) Representative images of E-cadherin immunolabelled intestinal organoids with or without DAPI channel post-expansion. Both pre- and post-expansion images were obtained using a 20×, N.A.=1.0 water objective. For these experiments, a pinhole of 2 Airy Units and Nyquist sampling was used during imaging. Images are denoised using PureDenoise ImageJ plugin.

Figure 12:
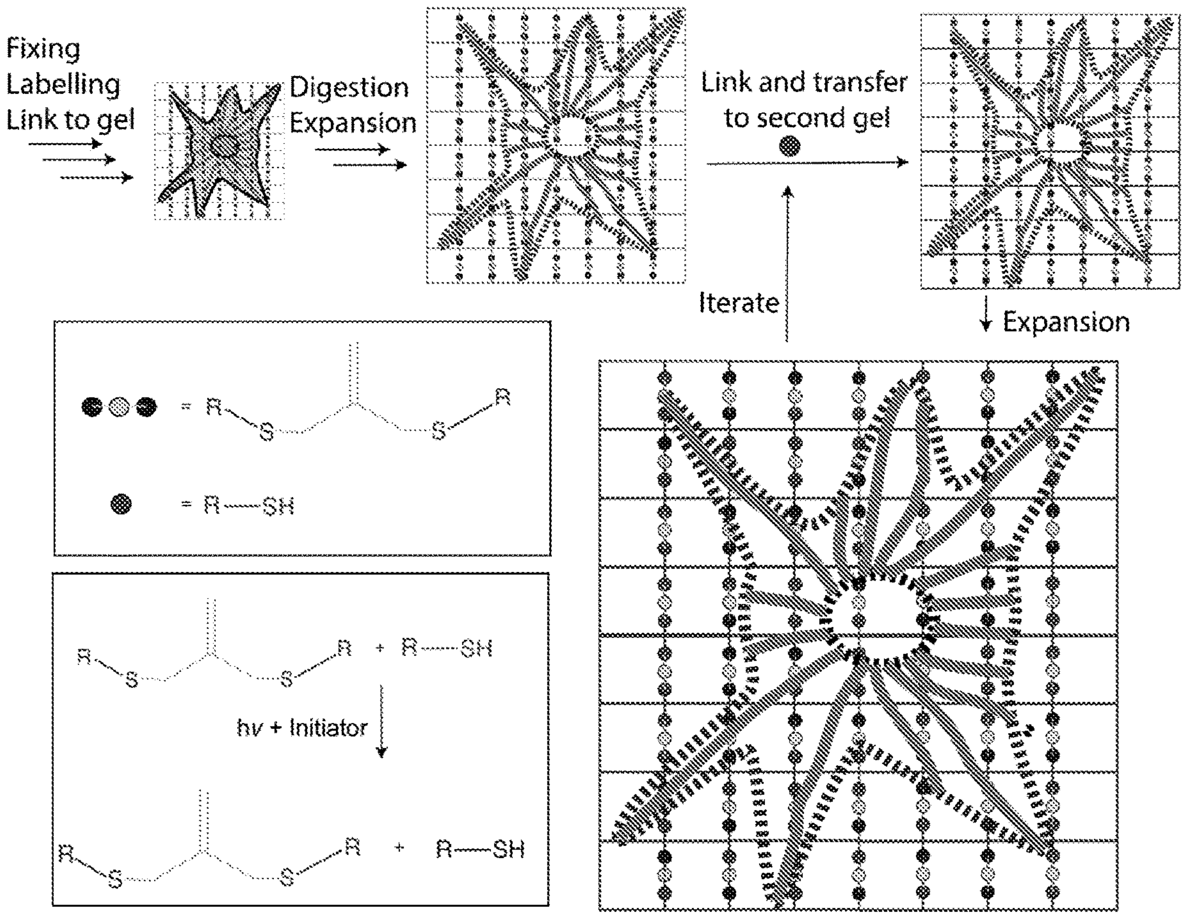

FIG. 12 is a schematic showing photo-iterative expansion microscopy (PhotoiExM). If a fixed and anchored biological sample of interest is permeated in the photopolymerizable, swellable gel solution that contains an allyl-sulfide transfer group, it can be expanded iteratively by using photo-mediated allyl-sulfide thiol exchange reaction, which can transfer the material of the former hydrogel to latter. As long as allyl-sulfide groups are preserved, the process can be repeated indefinitely.

Figure 13:
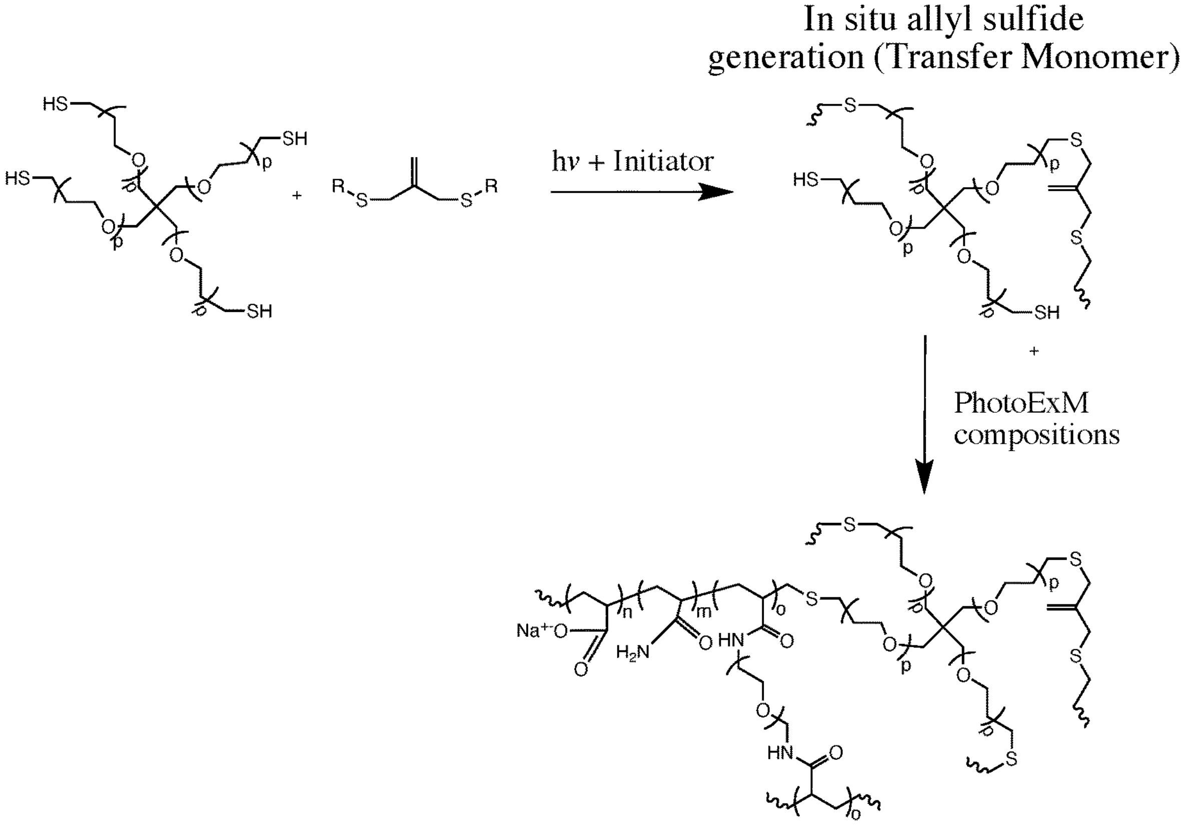

FIG. 13 is a schematic showing the strategy of in situ incorporation of allyl-sulfide group to the first photopolymerizable, swellable hydrogel. First, an allyl sulfide containing molecule can be reacted with a multi-arm PEG-SH chain transfer agent (4-arms are depicted in the scheme) in the presence of light and photoinitiator to in situ generate an allyl sulfide containing CTA. This moiety can then be mixed with the components of the PhotoExM composition (i.e. crosslinking monomer, electrolyte monomer, photoinitiator, additional CTA and plasticizing monomer) and upon light irradiation, PhotoiExM gels can be obtained.

Figure 14:
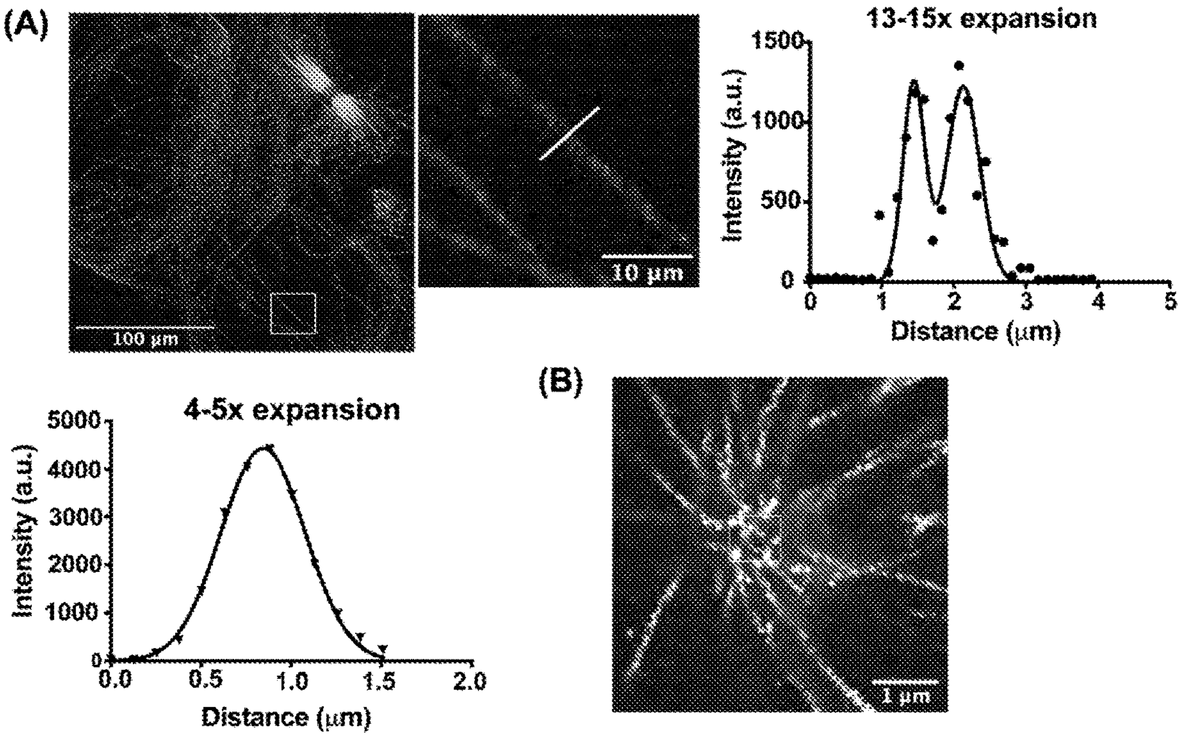

FIG. 14 is as set of three images and two plots. (A) Left image: Representative image of a α-tubulin immunolabeled C2C12 cells following PhotoiExM process, amounting to a cumulative expansion between 13-15×. Right image: A line scan perpendicular to the microtubule in 13-15× expanded sample shows two resolvable Gaussian's, indicating that PhotoiExM is able to resolve the hollow structure of an individual microtubule, which are known to be 24-27 nm in diameter. This resolution is not accessible with PhotoExM, as intensity line scans of microtubules as evidenced with single Gaussian intensity profile. In these images, scale bars are not scaled with respect to the expansion factor of the hydrogel. (B) Representative image of a α-tubulin immunolabeled dividing C2C12 cells. The hole in the center of the white rectangle represents a centriole, which is flanked with microtubules with a 9-fold symmetry. Expansion factor: 16-20×, Scale bar is 1 μm. Both of the images were taken using a 20×, N.A=1.0 water objective. For these experiments, a pinhole of 2 Airy Units and Nyquist sampling was used during imaging. Images are denoised using PureDenoise ImageJ plugin.

DETAILED DESCRIPTION OF THE PREFERRED EMBODIMENT

The present invention provides compositions and methods for preparing and using novel photopolymerizable, swellable polymer networks, which can be employed for expansion microscopy applications. The compositions and methods of the present invention have several advantages over the redox or thermally-initiated chain polymerization systems. First of all, the timing, kinetics and the location of the polymerization can be precisely tailored by the controlled illumination of light (e.g., time, intensity, focused region of light irradiation). This enables control over the density of the network crosslinks, and hence the expansion, via time and intensity of light irradiation alone. Furthermore, on-demand initiation of the photopolymerization can be especially beneficial for thicker samples, as polymerization can be initiated after uniform monomer diffusion. This is in contrast to prior systems, which typically require a precise concentration of an inhibitor to prevent premature polymerization. Furthermore, certain types of photoinitiated polymerizations, such as thiol-acrylate, thiol-ene and thiol-norbornene systems, present specific advantages for ExM applications due to their extremely fast kinetics and oxygen insensitivity. [Rydholm, A. E., Bowman, C. N. & Anseth, K. S. Degradable thiol-acrylate photopolymers: polymerization and degradation behavior of an in situ forming biomaterial. *Biomaterials* 26, 4495-4506 (2005); O'Brien, A. K., Cramer, N. B. & Bowman, C. N. Oxygen inhibition in thiol-acrylate photopolymerizations. *J. Polym. Sci. Part Polym. Chem.* 44, 2007-2014 (2006)] The novel technique taught herein has been termed "PhotoExM". PhotoExM allows immense tunability on the extent of expansion by controlling the time and intensity of light irradiation, as well as crosslinker, chain transfer agent and photoinitiator concentrations, which can all be precisely altered. Owing to this tunability, PhotoExM has been demonstrated to allow the expansion of a sample of interest, such as in vitro cell cultures and tissue section, between 3-7× depending on the desired application.

PhotoExM networks can be formed both by a chain-growth, step-growth or a combination of both, which is called as a mixed-mode photopolymerization depending on the choice of the monomers. Typically, networks with more step-growth character have improved mechanical properties, owing to increased homogeneity of crosslinking points, leading the improved network cooperativity in the presence of a mechanical force. This is especially helpful for ExM hydrogels that expand more than 4×, as decreased material density (i.e. 43) upon swelling can lead to soft, brittle hydrogels that are difficult to handle. Secondly, improved crosslinking homogeneity allow polymerization networks with decreased crosslinking density that are still mechanically robust enough, which in turn can enhance the expansion factor of the formed hydrogels.

Herein, chain growth refers to polymerization that proceeds via propagation of an active center (e.g. radical) from one polymerizable group to another, resulting in formation of polymer chains. These polymerizable groups can include, but are not limited to, acrylamide, acrylate, methacrylamide, methacrylate, styrene, vinyl, -ene, norbornene or strained alkyne groups. A crosslinking monomer that contain at least two polymerizable groups is required to form a network via pure chain growth polymerization. Alternatively, using step-growth polymerization, multi-arm monomers, which can be either heterofunctional or homofunctional, having complementary reactive groups are required to form a network. The minimum perquisite for the step-growth network formation is when a 3-arm monomer is reacted with a 2-arm monomer, and any combination with more arms would further yield step-growth networks. Examples of photoreactive complementary groups that can be used to prepare step-growth networks include, but are not limited to, thiol-norbornene, thiol-acrylate, thiol-acrylamide, thiol-ene, thiol-alkyne, thiol-maleimide, thiol-methacrylate, thiol-methacrylamide, strained alkyne dimers, anthracene dimers and azide-alkyne. "Mixed-mode network" refers to simultaneous step and chain growth of a hydrogel network.

While a diverse array of photopolymerizable formulations can be used for ExM applications, thiol-acrylate mixed-mode photopolymerization, has proven to be highly advantageous for ExM applications for numerous reasons. First of all, thiol-acrylate photopolymerization is a "one-photon, many reactions" event as a single radical group can be captured by a thiol and an acrylate group multiple times and, as a result, can initiate multiple chains (see e.g. FIG. 1). This leads to extremely fast gelation kinetics and PhotoExM gel preparation (e.g. 1 min.) Faster kinetics with light irradiation allows high throughput fabrication of PhotoExM gels. Secondly, thiol-acrylate photopolymerization is oxygen insensitive because peroxide radicals forming in the presence of oxygen can be effectively recycled by thiol groups (see e.g. FIG. 1). This prevents the formation of an oxygen inhibition layer and, therefore, depth dependent crosslinking density and expansion. Oxygen insensitivity also allows gel fabrication in ambient conditions, which significantly simplifies the design.

In one aspect of the present invention, thiol-acrylate mixed-mode networks were used to prepare swellable, photopolymerizable networks. These networks can be composed of a (1) crosslinking monomer, (2) an electrolyte monomer, (3) a chain transfer agent, (4) a photoinitiator and (5) a plasticizing monomer. All of the constituents can be mixed and stored in the same vial prior to hydrogel preparation.

Tables 1-3, below, present exemplary formulations of swellable, photopolymerizable solutions that can be employed in PhotoExM. The exemplary solutions include a crosslinking monomer of PEG-diacrylamide (0.75-1.25% by weight), an electrolyte monomer of sodium acrylate (16% by weight), one of the chain transfer agents of 4-arm, 5000 g/mol PEG-SH or 8-arm, 10000 g/mol PEG-SH (6% by weight), a photoinitiator of LAP (0.1% by weight), and a plasticizing monomer of acrylamide (3% by weight) all mixed together in a physiologically relevant buffer, such as phosphate buffer saline (PBS), at pH 7.4., which can additionally include 2M NaCl. Hydrogel formation could be achieved with 365 nm light irradiation with an intensity of 4.5 mW/cm$^2$ for only 60 seconds.

Figure 2:
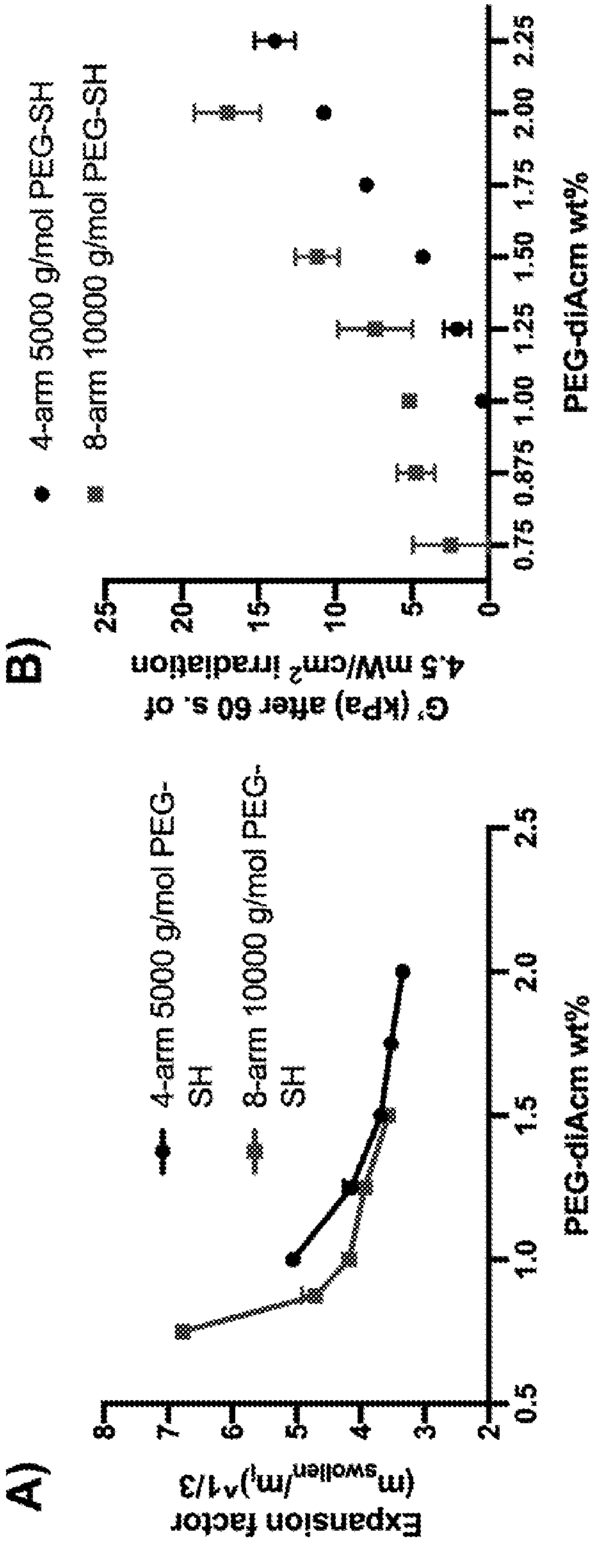
FIG. 2 is a pair of graphs depicting: (A) The expansion factor of PhotoExM hydrogels as a function of PEG-diAcm wt % when 6 wt % of two different chain transfer agents (4-arm, 10 kDa PEG-SH and 8-arm, 10 kDa PEG-SH) are used. (B) Shear moduli of PhotoExM hydrogels as a function of PEG-diAcM wt % when 6 wt % of two different chain transfer agents (4-arm, 10 kDa PEG-SH and 8-arm, 10 kDa PEG-SH) are used.

FIG. 2 shows the (A) expansion factor and the (B) shear moduli of these exemplary formulations. These results show that the expansion factor of PhotoExM hydrogels can be tuned between 3-7×. Herein, hydrogel expansion was achieved by washing the hydrogels four (4) times with deionized water (20 min. each). As a second, FIG. 2B shows that the hydrogels prepared using 8-arm, 10000 g/mol PEG-SH has improved mechanical properties, as compared to when 4-arm, 5000 g/mol PEG-SH was used, as a result of the increased step growth character of the network, in which the crosslinking points become more homogeneous.

In the examples below (i.e. examples 1-6), the feasibility of PhotoExM hydrogels to enlarge a biological sample of interest and image a biological cue of interest with a resolution greater than the diffraction limit of light using a conventional confocal microscope is demonstrated. Herein, a sample of interest generally refers to, but is not limited to, a biological, chemical or biochemical sample, such as a cell, array of cells, tumor, tissue, cell isolate, biochemical assembly, or a distribution of molecules suitable of microscopic analysis. Herein, biological cue of interest can refer to both proteins and nucleic acids, such as RNA.

Example 1—Generalized PhotoExM Protocol to Expand of a Biological Sample of Interest for the Purpose of Imaging Proteins of Interest Fixing, labeling and anchoring: Fixing and labeling can be carried out using conventional techniques. For anchoring the specimen in PhotoExM, an anchoring group can be used. Herein, anchoring group is defined as a molecule that can both react with the sample of interest and also contain at least one polymerizable group, such as 6-((acryloyl)amino) hexanoic acid, succinimidyl Ester (AcX). [Tillberg, P. W. et al. Protein-retention expansion microscopy of cells and tissues labeled using standard fluorescent proteins and antibodies. *Nat. Biotechnol.* 34, 987-992 (2016)] Biological specimens can be treated with 0.1 mg/mL AcX in PBS for 3-16 hours for anchoring, depending on the sample thickness. In addition to AcX, methacrylic acid succinimide ester and/or glutaraldehyde can be used as an anchoring group. [Chozinski, T. J. et al. Expansion microscopy with conventional antibodies and fluorescent proteins. *Nat. Methods* 13, 485-488 (2016] In addition to these anchoring groups, thiol-containing anchoring groups (i.e. Traut's reagent) are compatible with PhotoExM. [Traut, R. R. et al. Methyl 4-mercaptobutyrimidate as a cleavable crosslinking reagent and its application to the *Escherichia coli* 30S ribosome. *Biochemistry* 12, 3266-3273 (1973)]

The sample is washed 3× with PBS. Excess liquid is removed and the sample is transferred between two sigma-coated slides that are 450 μm apart. Next, the sample is permeated with one of the exemplary gel solutions (e.g. Formulation A, B or B1 as in Tables 1-3, below) between 5-10 minutes (e.g. single cell layers) or for up to 6 hours (e.g. tissue sections thicker than 100 μm). The gelation of the PhotoExM formulations was achieved using 365 nm light irradiation at $I_0$=4.5 mW/cm$^2$ for 1 min. Alternatively, light irradiation with a wavelength between about 300 to about 450 nm can be used; preferably between about 365 to about 410 nm. Irradiation time can be between about 20 seconds to about 10 minutes, which can alter the crosslinking density and hydrogel swelling. Preferably, irradiation time will be about 30 seconds to about 2 minutes. Irradiation intensity can be between about 1 to about 50 mW/cm$^2$, which can alter the crosslinking density and hydrogel swelling. Preferably, irradiation intensity will be between about 2.5 to about 10 mW/cm$^2$. The PhotoExM hydrogel is then detached from the sigmacoated slides and immersed into the digestion buffer. [[Tillberg, P. W. et al. Protein-retention expansion microscopy of cells and tissues labeled using standard fluorescent proteins and antibodies. *Nat. Biotechnol.* 34, 987-992 (2016)]

The samples can be digested for 16 hours at room temperature (e.g. single cell layers, thin tissue samples) or up to 48 hours at 50° C. (e.g. tissue sections thicker than 100 μm). The composition of the digestion buffer can be modified to contain up to 2M NaCl, rather than 0.8M NaCl. This is especially advantageous to prevent premature expansion of the biological specimens bound to a coverslip during the digestion step, which was observed to cause hydrogel deformation. For free standing PhotoExM gels, digestion buffer with 0.8 M NaCl is sufficient. For expansion longer than 16 hours, digestion buffer can be replaced every 24 hours to preserve proteolytic activity of the solution. Expansion was achieved by at least 3-fold DI $H_2O$ wash of the hydrogel; 20 minutes each. Finally, the sample can be mounted on either poly-lysine coated surfaces or by using agarose, and imaged using a confocal microscope. [Asano, S. M. et al. Expansion Microscopy: Protocols for Imaging Proteins and RNA in Cells and Tissues. *Curr. Protoc. Cell Biol.* 80, e56 (2018)] The samples must be kept in DI $H_2O$ solution throughout to prevent its shrinkage during imaging.

Example 2—Calculation of the Expansion Error: The Expansion Error is Calculated Via Non-Rigid Registration of Pre- and Post-Expansion Images of α-Tubulin Immunolabeled Human Mesenchymal Stem Cells (hMSCs)

Figure 3:
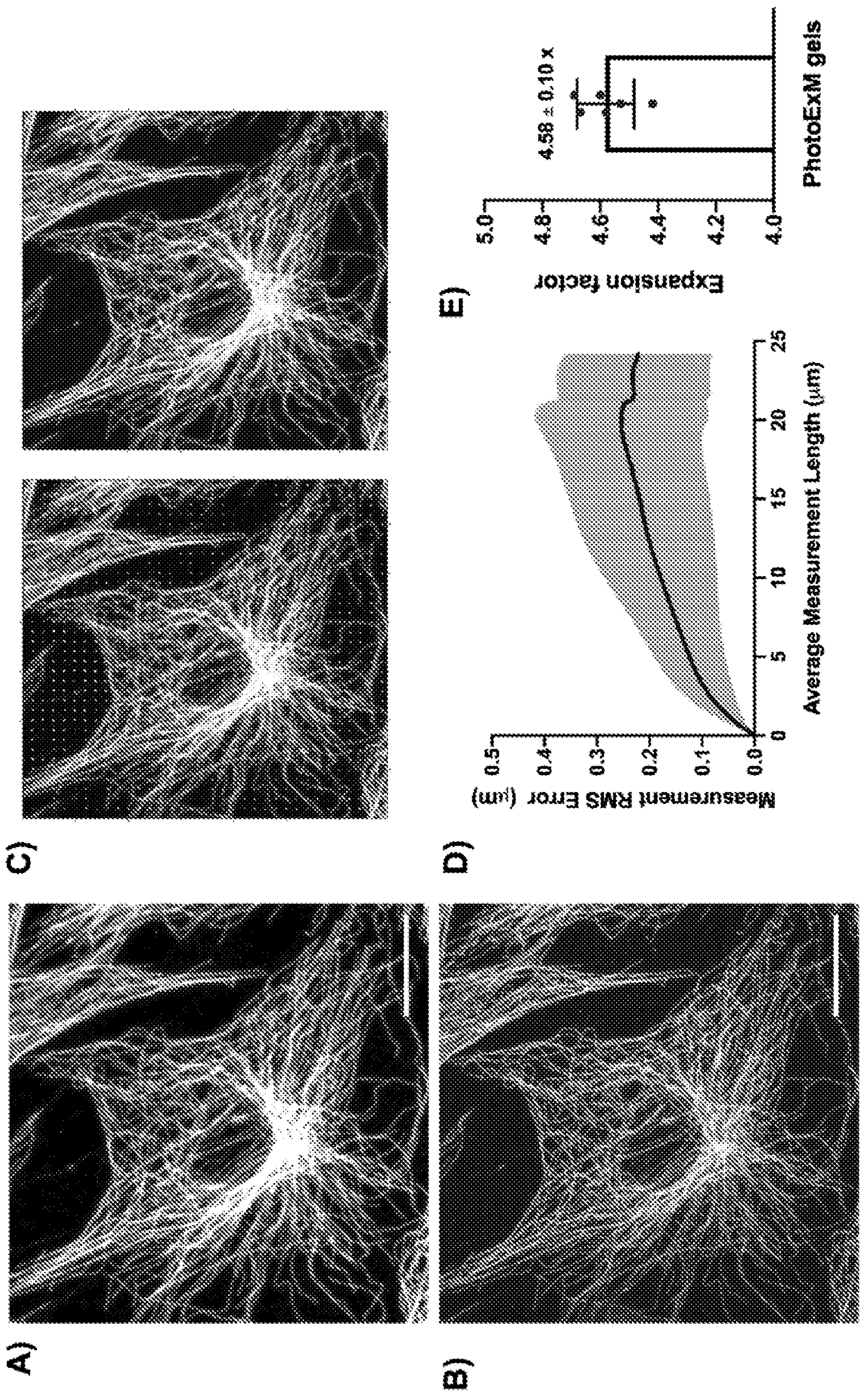
FIG. 3 is a set of four images (A-C; C has two images) and two graphs (D and E). Representative image of an identical α-tubulin immunolabeled human mesenchymal stem cell (hMSC) (A) pre-expansion and (B) post-expansion. Scale bar=20 μm. Samples are imaged using a 20×, N.A.=1.0 water objective. For these experiments, a pinhole of 1 Airy Unit and Nyquist sampling was used during imaging. (C) Non-rigid registration of the pre and post-expansion images, in which the white vectors on the left image represent the extent of the registration error. (D) Plot of root mean square (RMS) of the registration error as a function of average measurement length in expanded hydrogels, which was obtained by the registration of 16 different pre and post-expansion images from 6 different hydrogels. Gray region represents the standard deviation of the measurement RMS error across the samples. (E) Expansion factor of six different hydrogels used in the registration experiments.

Detailed protocol: hMSCs were seeded on 12 mm glass coverslips (0.2) for 72 hours until they reach to subconfluency. The cells were fixed and immunolabeled using an α-tubulin primary antibody (Abcam, ab7291, 1:250 dilution) and an Alexa Fluor 488 Plus (Thermo Fisher, 1:250 dilution) as the secondary antibody. [Chozinski, T. J. et al. Expansion microscopy with conventional antibodies and fluorescent proteins. *Nat. Methods* 13, 485-488 (2016)] Cells were first imaged before expansion, and a representative image is shown in FIG. 3A. Next, the samples were treated with 0.1 mg/mL AcX for 3 h. and washed 3× with PBS. The samples were permeated with the PhotoExM hydrogel solution composed of 0.875 wt % PEG-diacrylamide, 6 wt % 8-arm, 10000 g/mol PEG-SH, 16 wt % sodium acrylate, 3 wt % acrylamide and 0.1 wt % LAP in PBS with 2 M NaCl (Formulation B1, Table 2, below) for 10 minutes. PhotoExM hydrogels were prepared following 365 nm irradiation with an intensity of 4.5 $mW/cm^2$ for 1 minute. The samples were digested overnight using the digestion buffer containing 2 M NaCl and expanded using 4× $H_2O$ washes (20 min. each). The samples were mounted on top of cover glass previously coated with polylysine. Identical cells that were imaged pre-expansion were located, and imaged post-expansion (FIG. 3B). Both of the images were taken using an LSM 710 NLO (Carl Zeiss) confocal microscope with a 20× N.A. 1.0 water objective. For these experiments, a pinhole of 1 Airy Unit and Nyquist sampling was used during imaging. Non-rigid registration of the samples were carried out by using first TurboReg plugin in ImageJ and subsequently using a non-rigid registration algorithm in Matlab, which is provided by Edward Boyden group (FIG. 3C). [Chen, F., Tillberg, P. W. & Boyden, E. S. Optical imaging. Expansion microscopy. *Science* 347, 543-548 (2015)] A total of 16 different images from 6 different samples were registered, and the resulting root mean square (RMS) of the error as a function of average measurement length is shown in FIG. 3D, illustrating a maximum average RMS error of 2.8%. The shaded area represents the standard deviation of the measurement. These 6 samples were further used to determine the expansion factor and its variation between PhotoExM hydrogels (FIG. 3E), which is obtained by measuring the feature sizes (average of 3 features per image) of identical pre and post-expansion images.

Figure 4:
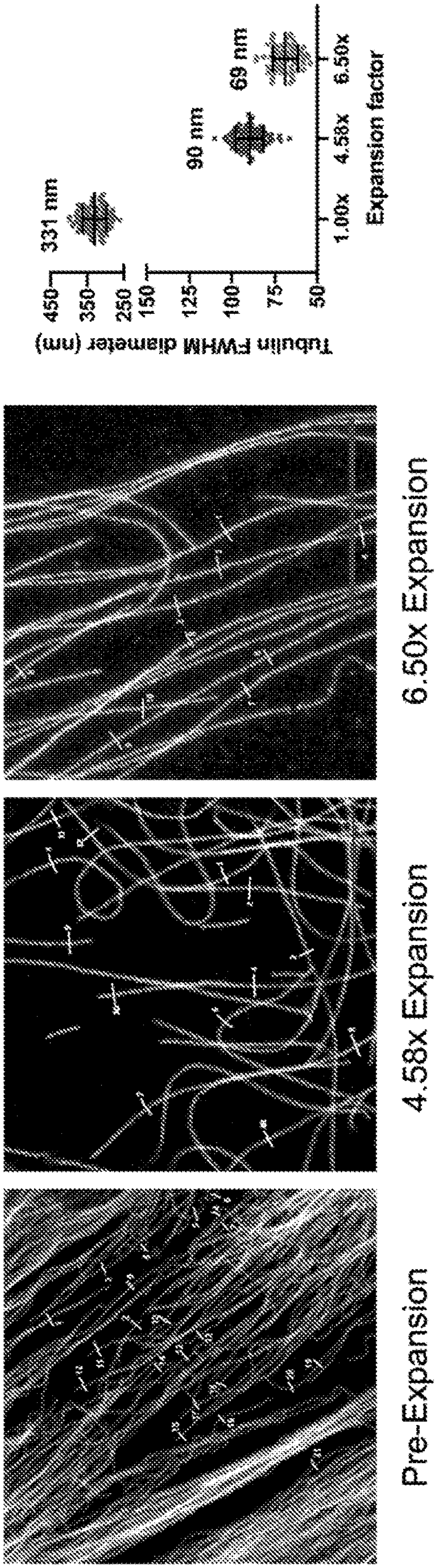
FIG. 4 is a set of three images and one plot. Representative images of α-tubulin immunolabeled hMSCs before expansion and after 4.58 and 6.50× post-expansion, when imaged using a 20×, N.A.=1.0 water objective. For these experiments, a pinhole of 1 Airy Unit and Nyquist sampling was used during imaging. Scale bar=5 μm. Angled lines in the images represent the regions that the fluorescence intensities of the perpendicular line scans were measured to calculate α-tubulin full width half-maximum (FWHM) diameters. Plot shows the quantification of the tubulin FWHM diameter before and after 4.58 and 6.50× expansion, which can give an estimate of the sample resolution. N=90-100 line scans, error bars represent the standard deviation.

Example 3—Calculation of the Microtubule Resolution: The Microtubule Resolution is Calculated by Measuring the Full-Width Half Maximum (FWHM) Diameter of the α-Tubulin Immunolabelled Microtubules in hMSCs Detailed protocol: hMSCs were seeded on 12 mm glass coverslips (0.2) for 72 hours until they reach to subconfluency. The cells were fixed and immunolabeled using an α-tubulin primary antibody (Abcam, ab7291, 1:250 dilution) and an Alexa Fluor 488 Plus (Thermo Fisher, 1:250 dilution) as the secondary antibody. Microtubules were first imaged before expansion (FIG. 4—left). Next, the samples were treated with 0.1 mg/mL AcX for 3 h. and washed 3× with PBS. For 4.58× expansion, samples were permeated with the PhotoExM hydrogel solution composed of 0.875 wt % PEG-diacrylamide, 6 wt % 8-arm, 10000 g/mol PEG-SH, 16 wt % sodium acrylate, 3 wt % acrylamide and 0.1 wt % LAP in PBS with 2 M NaCl (Formulation B1, Table 2, below) for 10 minutes. For the 6.50× expansion, samples with permeated with the PhotoExM hydrogel solution composed of 0.75 wt % PEG-diacrylamide, 6 wt % 8-arm, 10000 g/mol PEG-SH, 16 wt % sodium acrylate, 3 wt % acrylamide and 0.1 wt % LAP in PBS with 2 M NaCl for 10 minutes. (Formulation B3, Table 4, below) PhotoExM hydrogels were prepared following 365 nm irradiation with an intensity of 4.5 $mW/cm^2$ for 1 minute. The samples were digested overnight using the digestion buffer containing 2 M NaCl and expanded using 4× $H_2O$ washes (20 min. each). The samples were mounted on top of cover glass previously coated with polylysine. Microtubules were imaged post-expansion (FIG. 4, middle and right image). All of the pre- and post-expansion images were taken using an LSM 710 NLO (Carl Zeiss) confocal microscope with a 20× N.A. 1.0 water objective, a pinhole of 1 Airy Unit and with Nyquist sampling. For the determination of the sample resolution, fluorescence intensity of the perpendicular line scans of individual tubulin fibers were measured using ImageJ, and the tubulin fiber diameter was calculated from the full-width-half-maxima (FWHM) of the Gaussian approximations of the line scans. The values obtained in post-expansion images were scaled down using the calculated expansion factor. The microtubule resolution data is shown in the plot in FIG. 4 pre- and post-expansion at two different expansion factors.

Example 4—Comparison with Superresolution Microscopy

Stimulated emission/depletion (STED) microscopy was used to image and quantify focal adhesion, and their characteristics were compared to the images obtained via PhotoExM.

Figure 5:
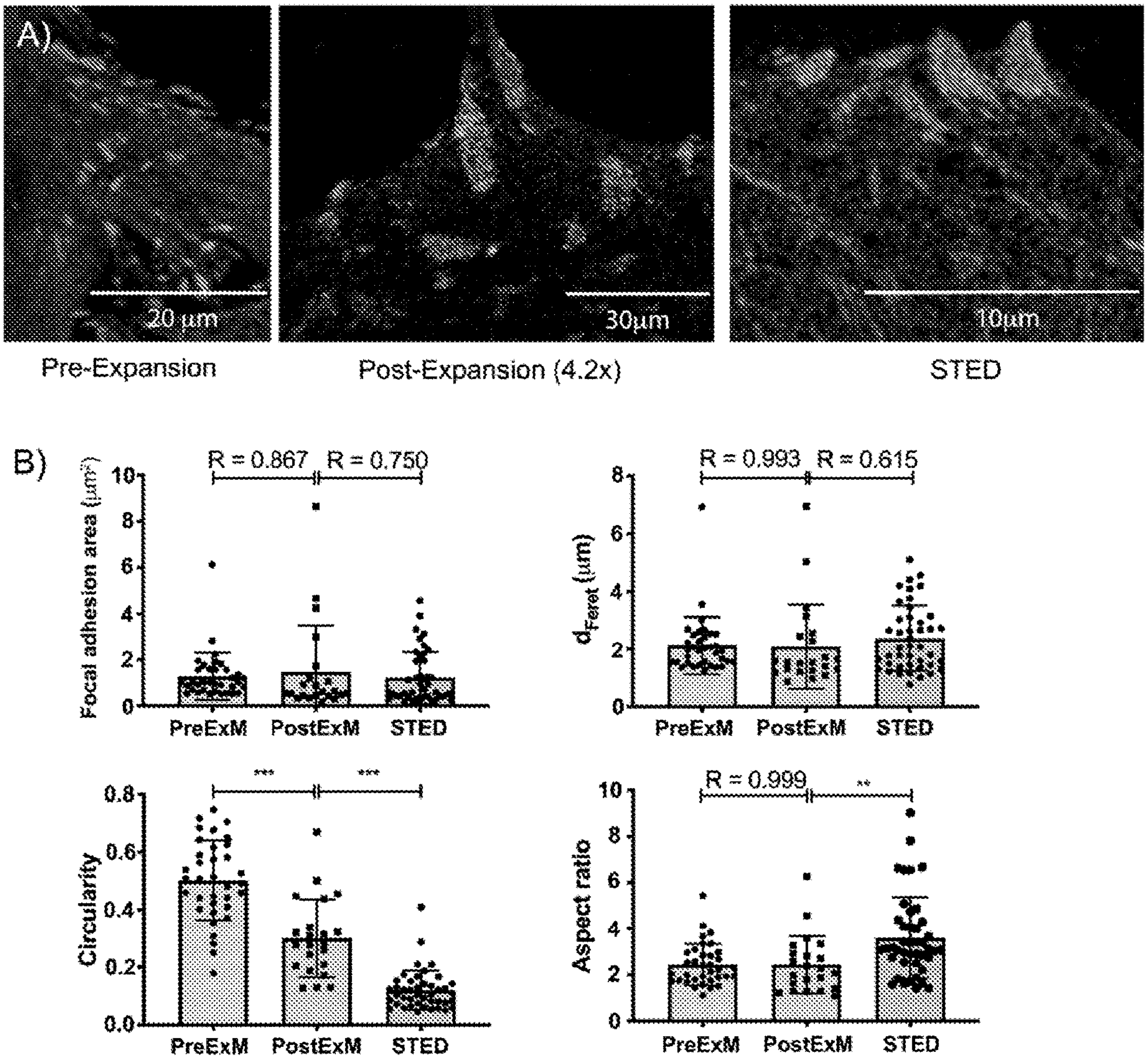
FIG. 5 is a set of three images and four graphs. (A) Representative images showing the focal adhesions obtained before expansion (left), post-expansion (middle) and via STED microscopy (right). Herein, the expansion factor is 4.2×. (B) Characterization and comparison of focal adhesions imaged before and after expansion using a 20×, N.A.=1.0 water objective as well as via STED microscopy. Confocal images were taken by using a pinhole of 1 Airy Unit and Nyquist sampling was used during imaging.

Detailed protocol: Muscle myoblast (C2C12) cells were seeded on 12 mm glass coverslips (0.2) for 48 hours. The cells were fixed and immunolabeled using a paxillin primary antibody (Abcam, ab32084, 1:150 dilution) and an Alexa Fluor 488 (Thermo Fisher, 1:250 dilution) as the secondary antibody. [Yang, C. et al. Spatially patterned matrix elasticity directs stem cell fate. *Proc. Natl. Acad. Sci.* 113, E4439-E4445 (2016)] One-half of the samples were mounted using ProLong Glass (Thermo Fisher) and imaged using STED microscopy (Leica, TCS SP8 STED 3×) (FIG. 5A, right). The other one-half of the samples were first imaged pre-expansion (FIG. 5A, left), and subsequently treated with 0.1 mg/mL AcX for 3 hr., and washed 3× with PBS. Samples were permeated with the PhotoExM hydrogel solution composed of 1.25 wt % PEG-diacrylamide, 6 wt % 4-arm, 5000 g/mol PEG-SH, 16 wt % sodium acrylate, 3 wt % acrylamide and 0.1 wt % LAP in PBS (Formulation A, Table 1, below) for 10 minutes. The samples were digested overnight using digestion buffer and expanded using 4× $H_2O$ washes (20 min. each). The samples were mounted on top of cover glass previously coated with polylysine. Paxillin immunolabelled focal adhesions were imaged post-expansion (FIG. 5A, center). For both pre- and post-expansion images, LSM 710 NLO (Carl Zeiss) confocal microscope with a 20× N.A.

1.0 water objective, a pinhole of 1 Airy Unit and with Nyquist sampling were used. The values obtained in post-expansion images were scaled down using the calculated expansion factor. FIG. 5B shows the respective characterization of the focal adhesion imaged pre- and post-expansion and as well as using STED microscopy.

Example 5—Expansion of Skeletal Muscle Tissue Sections

Tibialis Anterior (TA) muscle of adult mice (3-6 months) was isolated, sectioned, immunolabeled and expanded using PhotoExM to determine the location and abundance of TDP43, an alternative splicing factor believed to play an important role in muscle development and regeneration. [Vogler, T. O. et al. TDP-43 and RNA form amyloid-like myo-granules in regenerating muscle. *Nature* 563, 508-513 (2018)]

Figure 6:
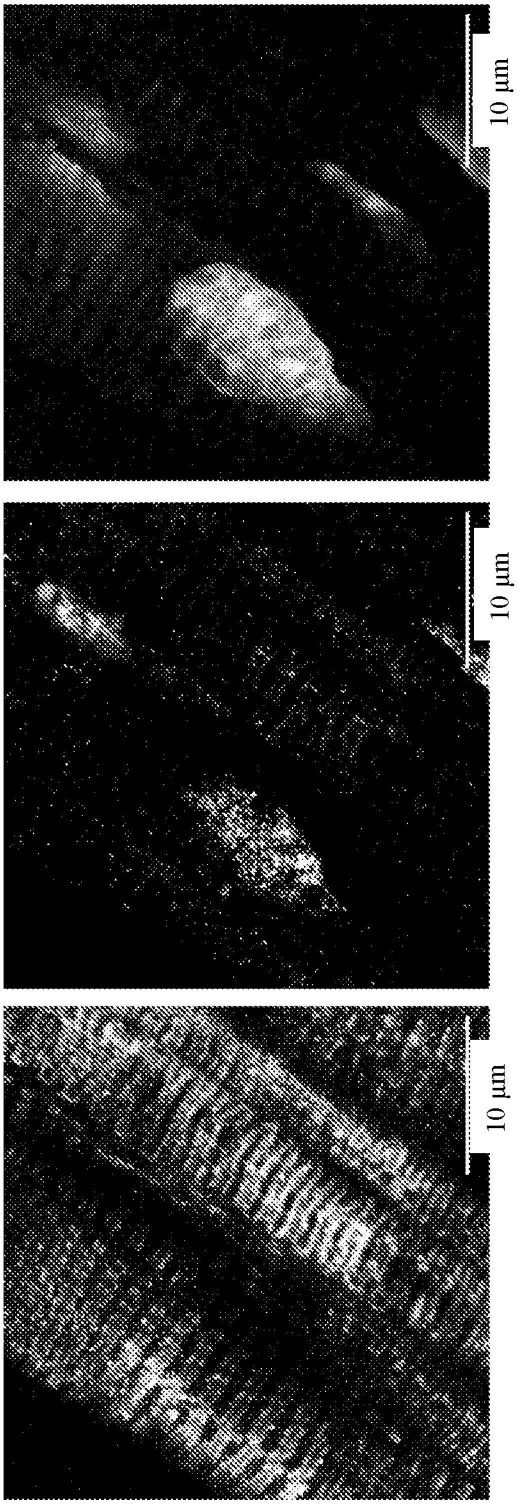
FIG. 6 is a set of three representative images showing expanded cross-sections of mouse skeletal muscle immunolabeled with myosin (left), TDP-43 (center) and DAPI (right). Samples are imaged using a 20×, N.A.=1.0 water objective. For these experiments, a pinhole of 1 Airy Unit and Nyquist sampling was used during imaging.

Detailed protocol: TA muscles of adult mice (3-6 months) were isolated, fixed and sectioned (10 μm thick) and immunolabeled. For the immunolabeling, an anti-heavy chain myosin (mouse, SCBT, 1:250) and anti-TDP43 (rabbit, ProteinTech, 1:200) were used a primary antibodies and AlexaFluor 488 (Thermo Fisher, goat-anti-rabbit, 1:250) and AlexaFluor 546 (Thermo Fisher, donkey-anti-mouse, 1:250) were used as secondary antibodies. Tissue sections were immobilized on gelatin-coated 12 mm coverslips and treated with 0.1 mg/mL AcX for 6 hours and washed 3× with PBS. Samples were permeated with the PhotoExM hydrogel solution composed of 1.25 wt % PEG-diacrylamide, 6 wt % 4-arm, 5000 g/mol PEG-SH, 16 wt % sodium acrylate, 3 wt % acrylamide and 0.1 wt % LAP in PBS (Formulation A, Table 1, below) for 15 minutes. The samples were digested overnight using digestion buffer and expanded using 4× $H_2O$ washes (20 min. each). Next, nuclei were labelled using DAPI (1:500) for 1 h. in $H_2O$. Samples were washed 3 more times with $H_2O$, mounted on polylysine-coated glass and imaged (Zeiss LSM 710 NLO, 20×, 1 N.A. objective, 1 AU, Nyquist sampling). FIG. 6 shows a representative image of a TDP43, myosin and DAPI labelled mice tissue sections post-expansion.

Example 6—Expansion of Muscle Myofibers to Locate Muscle Satellite Cells

Individual muscle myofibers were isolated, immunolabeled using Pax7 immunolabeling, and expanded to locate and discern cellular features of muscle satellite cells (MuSCs), which are small cells with a primarily nuclear morphology, making them very difficult to resolve using conventional microscopy techniques.

Figure 7:
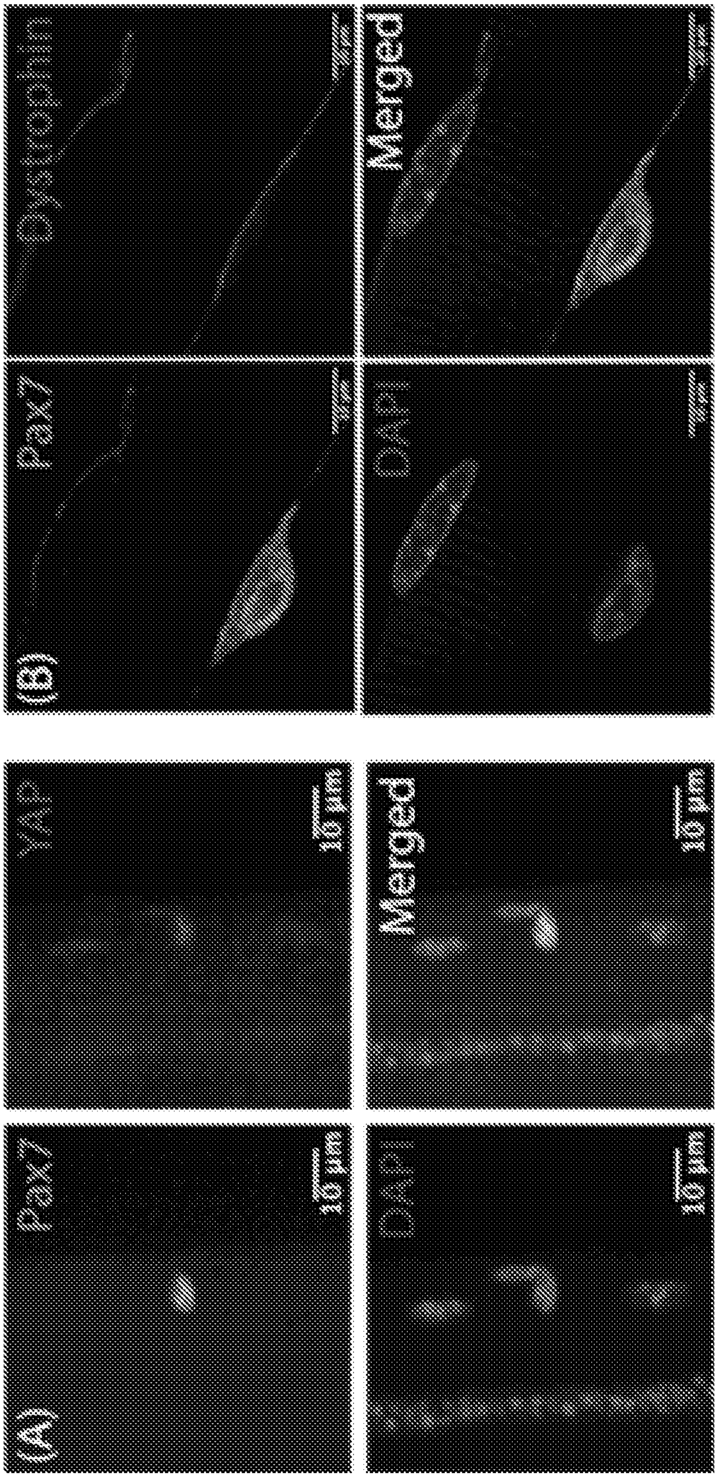
FIG. 7 is a set of eight images (Four images for (A) and four images for (B)). (A) Imaging of SCs on isolated mouse myofibers. Conventional confocal microscopy does not enable sufficient subcellular resolution of MuSCs on myofibers. In this example, it is not possible to resolve YAP/TAZ translocation. (B) Representative image of a 3.3× expanded myofiber showing a MuSC together with a myoblast. PhotoExM clearly enables subcellular resolution of MuSCs. Samples are imaged using a 20×, N.A.=1.0 water objective. For these experiments, a pinhole of 1 Airy Unit and Nyquist sampling was used during imaging. Images are denoised using PureDenoise ImageJ plugin.

Detailed protocol: Myofibers from TA or EDL muscles of adult mice (3-6 months) were isolated, fixed and immunolabeled using previously established methods. [Vogler, T. O., Gadek, K. E., Cadwallader, A. B., Elston, T. L. & Olwin, B. B. Isolation, Culture, Functional Assays, and Immunofluorescence of Myofiber-Associated Satellite Cells. in *Skeletal Muscle Regeneration in the Mouse: Methods and Protocols* (ed. Kyba, M.) 141-162 (Springer, 2016). doi:10.1007/978-1-4939-3810-0_11] For the immunolabeling, Pax7 (mouse, Developmental Studies Hybridoma Bank, 1:250), dystrophin (rabbit, Abcam, 15277, 1:63) and laminin (rabbit, Sigma Aldrich, L9393, 1:63) primary antibodies and AlexaFluor 488 (Thermo Fisher) and AlexaFluor 546 (Thermo Fisher) secondary antibodies were used. The samples were immobilized on gelatin-coated 12 mm coverslips and treated with 0.1 mg/mL AcX for 6 hours and washed 3× with PBS. Samples were permeated with the PhotoExM hydrogel solution composed of 1.25 wt % PEG-diacrylamide, 6 wt % 8-arm, 10000 g/mol PEG-SH, 16 wt % sodium acrylate, 3 wt % acrylamide and 0.1 wt % LAP in PBS (Formulation B2, Table 3, below) for 15 minutes. The samples were digested overnight using digestion buffer and expanded using 4× $H_2O$ washes (20 min. each). Next, nuclei were labelled using DAPI (1:500) for 1 h. in $H_2O$. Samples were washed 3 more times with $H_2O$, mounted on polylysine-coated glass and imaged (Zeiss LSM 710 NLO, 20×, 1 N.A. objective, 1 AU, Nyquist sampling). FIG. 7 shows representative images of MuSCs ($Pax7^+$) on myofibers that were immunolabeled with dystrophin as well as representative images of MuSCs imaged without expansion for comparison.

Example 7—Generalized PhotoExM Protocol to Expand of a Biological Sample of Interest for the Purpose of Imaging Nucleic Acids of Interest Herein, we demonstrate that PhotoExM hydrogels can be effectively used to enlarge a sample of interest and image nucleic acids of interest with super-resolution, by using identical PhotoExM compositions and photo-initiated polymerization without requiring changes in the PhotoExM hydrogel compositions and preparation.

Figure 8:
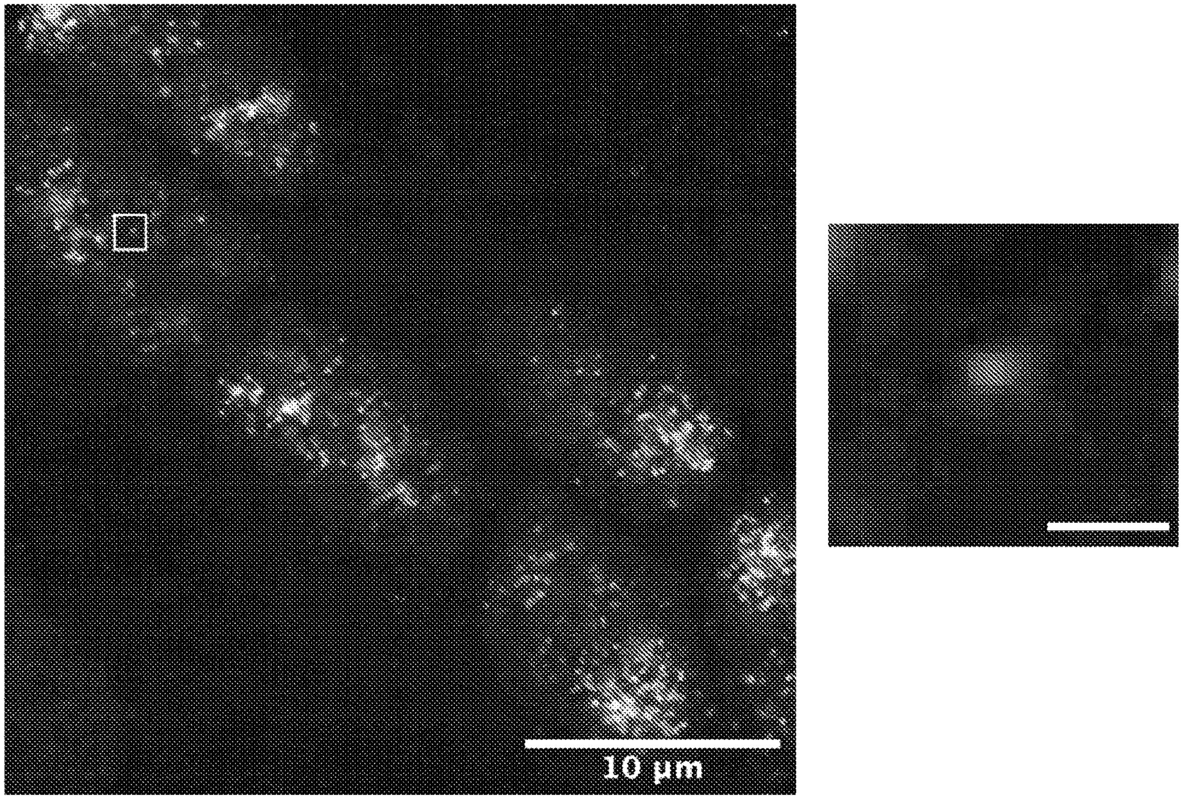
FIG. 8 is a set of two images. Left: Localization of titin mRNA in differentiated C2C12 cells using expansion fluorescence in situ hybridization (PhotoExFISH). Red and green channels label the 5'- and 3'-ends of the titin mRNA, respectively. Right: Zoomed image of the white box toward the upper left corner on the large image showing two different labels separated with the resolution limit of the measurement. The image was obtained using a 20×, N.A=1.0 water objective, and the expansion factor was 4.3×. For these experiments, a pinhole of 1 Airy Unit and Nyquist sampling was used during imaging. Images are denoised using PureDenoise ImageJ plugin.

Detailed protocol: Muscle myoblast (C2C12) cells were differentiated into muscle myofibers on 18 mm gelatin-coated glass coverslips (0.2) for 48 hours. Three days post-differentiation, myofibers were fixed and permeabilized using previously established protocols. [Asano, S. M. et al. Expansion Microscopy: Protocols for Imaging Proteins and RNA in Cells and Tissues. *Curr. Protoc. Cell Biol.* 80, e56 (2018)] The samples were washed 2× with PBS and 1× with 20 mM MOPS buffer for 5 minutes each and subsequently treated with a 1:150 or 1:50 dilution of 1 mg/mL tethering group Label-X, which can introduce an acrylamide group to guanine nucleotides, overnight at 37° C. [Chen, F. et al. Nanoscale imaging of RNA with expansion microscopy. *Nat. Methods* 13, 679-684 (2016)] The samples were washed 3× with PBS and permeated with the PhotoExM hydrogel solution composed of 0.75 wt % PEG-diacrylamide, 6 wt % 8-arm, 10000 g/mol PEG-SH, 16 wt % sodium acrylate, 3 wt % acrylamide and 0.1 wt % LAP (Formulation B3, Table 4, below) in PBS with 2 M NaCl for 15 minutes. The samples were digested overnight using digestion buffer with 2M NaCl and washed 3× with PBS for 5 minutes each. Next the hydrogels are hybridized with custom design probes that can hybridize with the 5'- or 3'-ends of titin mRNA's. The 5'-hybridizing probe contained a fluorophore excitable at 647 nm, and the 3'-hybridizing probe contained a fluorophore excitable at 555 nm. The hybridization was carried out overnight at 37° C. in hybridization buffer (2× sodium citrate buffer containing 10 w/v % dextran sulfate and 10 v/v % formamide). The hydrogels were washed once with hybridization buffer and once more with wash buffer (2× sodium citrate buffer containing 10 v/v % formamide), stained with DAPI (1:1000) during these washes, and expanded by washing the gels 4× with 0.02×PBS (20 minutes each). The final expansion of the hydrogels was 4.3×. The samples were mounted on polylysine-coated coverslips, and imaged (Zeiss LSM 710 NLO, 20×, 1 N.A. objective, 1 AU, Nyquist sampling). FIG. 8 shows a representative image, showing the subnuclear localization of titin probes in differentiated myoblast. The zoomed region shows two probes labelling different ends of titin that are separated 70-120 nm apart, and presumably shows a single titin mRNA.

Apart from cells grown on plastic or glass surfaces and tissue sections, biomaterials that permit in vitro culture of biological samples of interest are extensively used in biology. [Caliari, S. R. & Burdick, J. A. A practical guide to hydrogels for cell culture. *Nat. Methods* 13, 405-414 (2016)] However, imaging a sample of interest on or in a biomaterial represents similar challenges to that of tissues (e.g. sample opacity, signal attenuation, aberrations). Therefore, thin sectioning of the biomaterial is typically carried to obtain biological information from inside the biomaterial, which is laborious, can result in dimensional changes and artifacts, and still subject to signal attenuation depending on the sample of thickness and microscope setup.

Figure 9:
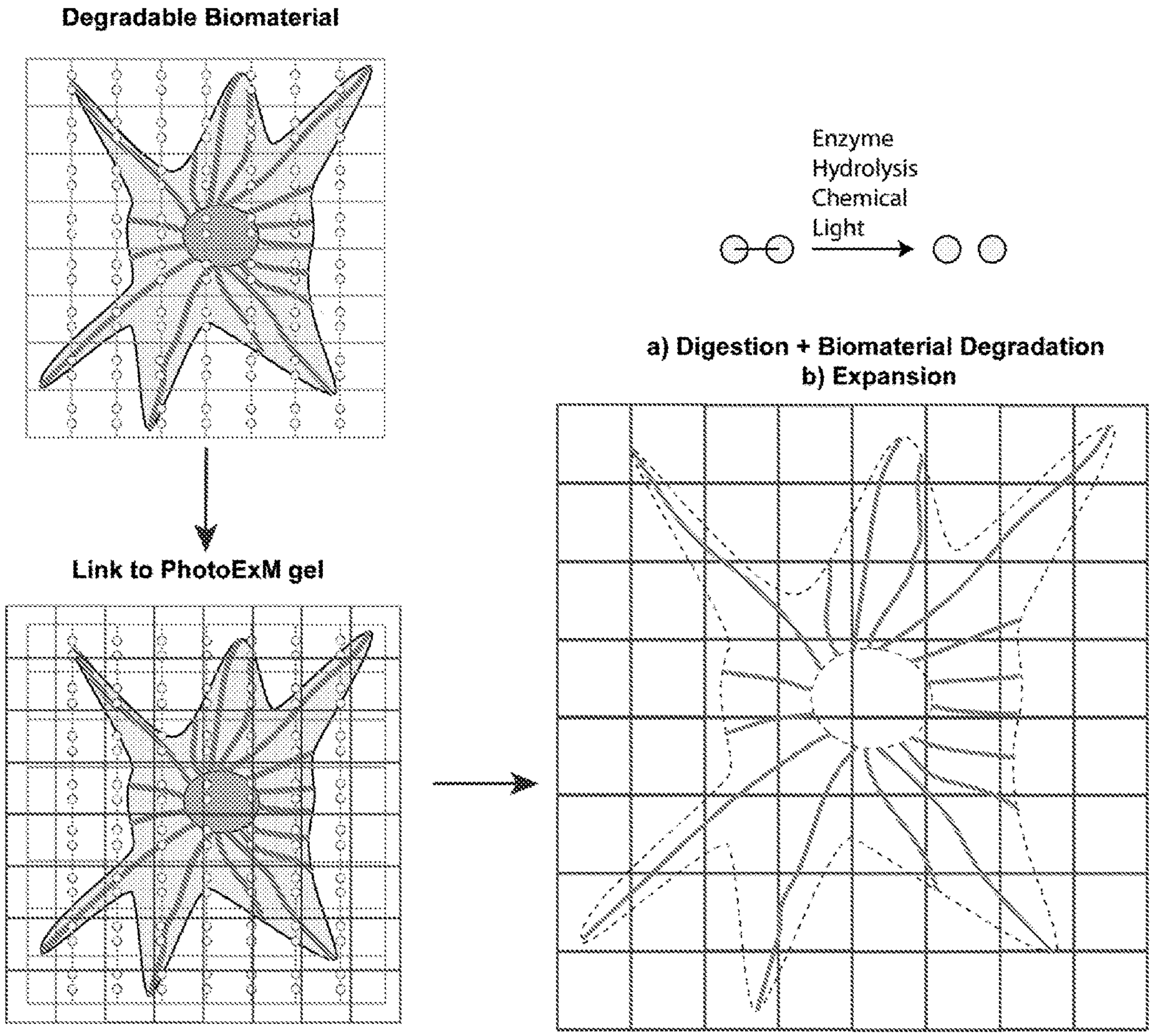
FIG. 9 is a schematic showing the method of clearing and expanding a biomaterial, which is referred to as gel-to-gel transfer (GtG). A fixed and anchored sample of interest in a degradable biomaterial is permeated with the photopolymerizable, swellable hydrogel solution, which is formed via light irradiation. Next, the sample of interest and the degradable biomaterial is degraded either simultaneously or sequentially depending on the mode of degradation of the biomaterial, which could be enzymatic, hydrolytic, chemical or by light. The sample is subsequently expanded and optically cleared by promoting the dissociation of the electrolyte monomer by water exchange to 3-7× of its original size, which enables super-resolution microscopy in a standard confocal microscope.

Herein, a general strategy for clearing and enlarging a biomaterial of interest is disclosed. The biomaterial can be used to culture and/or grow or incorporate a biological sample of interest, including but not limited to a cell, array of cells, tumor, tissue, cell isolate, biochemical assembly, or a distribution of molecules suitable of microscopic analysis. The overall strategy, in which we called as "gel-to-gel transfer" (GtG) relies on the (i) permeation of a degradable biomaterial with the swellable, photopolymerizable hydrogel solution, ii) in situ photopolymerization of the photopolymerizable hydrogel solution in the biomaterial and iii) degradation and clearance of the biomaterial and iv) expansion of the photopolymerized hydrogel to image a biological cue of interest, which could be a protein or a nucleic acid. Schematic illustration of GtG is provided in FIG. 9. Any of the range of the photopolymerized hydrogel (PhotoExM) formulations disclosed above are compatible with GtG.

Biomaterials can be designed to be degradable, depending on the presence or introduction of functional groups that can be cleaved in various means, including enzymatic, hydrolytic, chemical or photo-degradation. Any degradable biomaterial is compatible with PhotoExM. Various examples of enzymatically degradable biomaterials can include, but are not limited to, (i) natural protein/polymer/decellularized tissue-based materials that can be digested with a suitable enzyme, including, but not limited to, Matrigel and its derivatives, collagen, gelatin, fibronectin, vitronectin, alginate, fibrin, silk, elastin amongst many others, or (ii) synthetic biomaterials containing proteolytically degradable monomers including but not limited to, matrix-metalloproteinase (MMP) degradable peptide sequences, elastin-degradable sequences, amongst many others. As a second, a hydrolytically degradable biomaterial can consist of a biomaterial containing functional groups that can be completely dissolved in aqueous environments. Examples of these functional groups can include but are not limited to, ester groups, thioester groups, acrylate groups, methacrylate groups, hydrazone groups, oxime groups, amongst many others. A chemically degradable biomaterial refers to a biomaterial that can be completely dissolved when treated with a molecule that can cleave the covalent bonds of the biomaterial. The molecule-covalent bond pairs that can be used include glutathione-disulfude bonds, TCEP-disulfide bonds, DTT, disulfide bonds, borohydride-hydrazone bonds, borohydride-imine bonds, thiol-thioester bonds, amongst many others. Finally, a photo-degradable biomaterial can contain photodegradable bonds that can be cleaved upon light irradiation, in the absence or presence of a photoinitiator, resulting in the complete dissolution of the biomaterial. Examples of the photodegradable bonds can include, but are not limited to, o-nitrobenzyl groups, coumarin groups, disulfide groups, allyl sulfide groups, anthracene groups, amongst many others.

If these biomaterials are used to culture, grow or encapsulate a biological sample of interest, GtG enables the transfer of the spatial position of the biological sample of interest to the swellable, photopolymerizable hydrogel solution either via simultaneous or sequential degradation of the biological sample of interest and the biomaterial. Afterwards, remaining photopolymerizable hydrogel can be expanded to image the sample of interest with super-resolution and without depth-dependent attenuation of light using a conventional confocal microscope. If biomaterial used can be degraded with enzymes (e.g. proteinase K) that also digests the biological sample of interest, simultaneous degradation is feasible. Otherwise, sequential degradation is required.

Photopolymerized hydrogels, and more specifically PhotoExM hydrogels, for GtG methods are highly attractive as they enable sufficient control over the time and kinetics of the initiation and termination of the polymerization. Biomaterials can be prepared in varying thicknesses, in which samples less than a cm thick are the most desirable, indicating that the components of the swellable hydrogel formulation needs to uniformly diffuse across the sample prior the gel formation in GtG. Since PhotoExM hydrogels are only formed after light irradiation, the hydrogel components can be uniformly diffused throughout the sample, which can take between 10 minutes to 24 hours, depending on the thickness of the biomaterial and the biological specimen present within. The time and the intensity of the light irradiation can be controlled to ensure uniform PhotoExM hydrogel crosslinking density throughout the sample. For instance, if light irradiation intensity would depend on sample thickness, which can occur for partially opaque and/or absorbing biomaterials, both the irradiation time and intensity can be increased to drive hydrogel formation to complete conversion at any depth of the biomaterial, which would circumvent non-uniform biomaterial expansion that may occur by thickness-dependent irradiation.

In the examples below (examples 8 and 9), the feasibility of GtG to enlarge a degradable biomaterial and image a biological cue of interest within the biomaterial with a resolution greater than the diffraction limit of light using a conventional confocal microscope is demonstrated.

Example 8—A Protocol for Expanding a Sample of Interest Cultured on Two-Dimensional (2D) Degradable Biomaterials Biological samples have been extensively cultured on biomaterials with well-defined properties, as they offer tunable or dynamic mechanical properties, tunable density of adhesive ligands and surface receptors. Therefore, 2D biomaterials offer a more physiologically relevant model compared to supraphysiologically stiff surfaces, such as glass and tissue culture plastic.

A strategy to expand a sample of interest cultured on two-dimensional biomaterial is as follows:

i) Preparation of the degradable biomaterial, ii) culturing the sample of interest on the biomaterial, iii) fixing the sample of interest, iv) anchoring the sample of interest with an anchoring group, v) permeating the biomaterial with the PhotoExM gel solution twice, vi) removing most of the excess gel solution, and putting a non-sticking, transparent and flat substrate (e.g. Sigmacoated glass) on top of the biomaterial to confine the PhotoExM gel only to the inside and the surface of the biomaterial, vii) photopolymerizing the PhotoExM gel, viii) digestion of the sample of interest, ix) degradation of the biomaterial, which can be carried out simultaneously with the previously step, x) Expansion of the PhotoExM hydrogels by repeated $H_2O$ washes.

Figure 10:
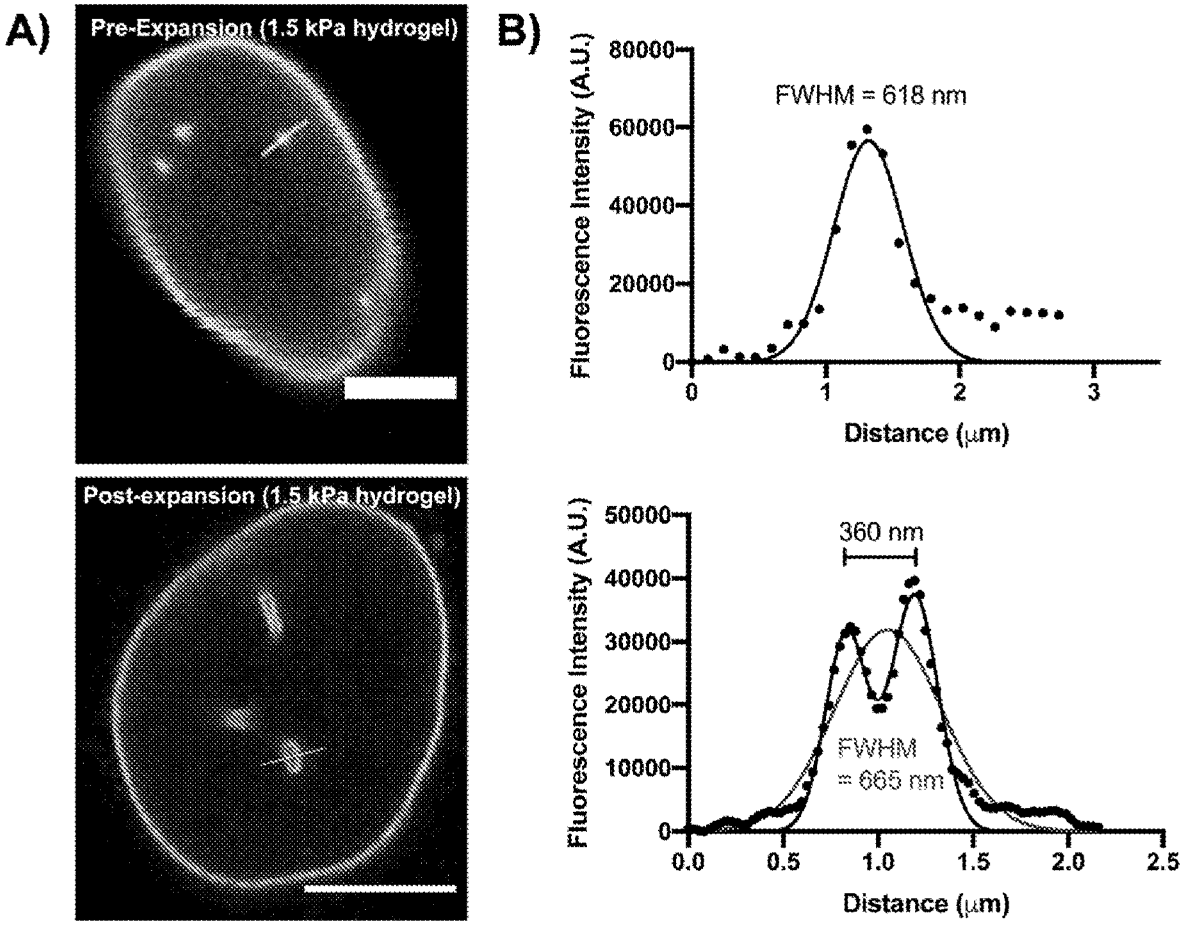
FIG. 10 is a set of two images and two plots. (A) Representative images of Lamin A immunolabeled hMSCs cultured on enzymatically degradable, E'=1.5 kPa synthetic hydrogels before and after expansion (Expansion=4.58×). Scale bars=5 μm, imaged using a 20×, N.A=1.0 water objective. For these experiments, a pinhole of 1 Airy Unit and Nyquist sampling was used during imaging. These degradable synthetic hydrogels were prepared using strain promoted azide alkyne cycloaddition (SPAAC) reaction between a 4-arm, 20 kDa PEG-dibenzocyclooctyne and a $N_3$-VPMSMRGGK($N_3$)-G, which is a synthetic peptide substrate of matrix metalloproteinase (MMP). [Patterson, J.

As a more specific example, to demonstrate the feasibility of GtG starting from 2D biomaterials, proteolytically degradable hydrogels were synthesized using strain promoted azide/alkyne cycloaddition (SPAAC) reaction between a dibenzocyclooctyne group and a azide group. [Brown, T. E. et al. Secondary Photocrosslinking of Click Hydrogels To Probe Myoblast Mechanotransduction in Three Dimensions. *J. Am. Chem. Soc.* 140, 11585-11588 (2018)] More specifically, a 4-arm, 20000 g/mol PEG-DBCO was reacted with a bis-azide functionalized proteolytically degradable peptide sequence ($N_3$-VPMSMRGGK($N_3$)G). This sequence can be cleaved with various proteases, including Proteinase K. Furthermore, 1 mM of an azide-functionalized fibronectin mimetic sequence ($N_3$-GRGDS) was incorporated into the hydrogel to promote cell attachment. These gels were designed to contain stoichiometric ratios of azide/DBCO, since excess DBCO groups can undergo a photo-crosslinking reaction, that can prevent its degradation. The hydrogel formation was allowed to continue for 10 minutes at room temperature on top of azide-functionalized glass coverslips, which were prepared using previously published protocols. [DeForest, C. A. & Anseth, K. S. Cytocompatible click-based hydrogels with dynamically tunable properties through orthogonal photoconjugation and photocleavage reactions. *Nat. Chem.* 3, 925-931 (2011)] Hydrogels with an elastic moduli (E') of 1.5 kPa were used in these experiments. The hydrogel thickness was chosen to be 150 μm. hMSCs were cultured on these hydrogel for 3 days, fixed and immunolabeled for Lamin A (primary antibody: 1:250, abcam and secondary antibody: goat-anti-mouse alexafluor 488 plus, 1:250). hMSCs on degradable SPAAC hydrogels were first imaged before expansion, and a representative image is shown in FIG. 10A (upper image). Next, the samples were treated with 0.1 mg/mL AcX for 6 hours, washed 3× with PBS and permeated twice with a PhotoExM formulation comprised of 0.875 wt % PEG-diacrylamide, 6 wt % 8-arm, 10000 g/mol PEG-SH, 16 wt % sodium acrylate, 3 wt % acrylamide and 0.1 wt % LAP (Formulation B1, Table 2, below) in PBS with 2 M NaCl for 30 minutes each. Following the second wash, the remaining liquid was wicked using a chemwipe, a 18 mm sigmacoated coverslip was put on top of the gel and PhotoExM gels were formed by 365 nm light irradiation for 1 minutes at 4.5 $mW/cm^2$ intensity. The 18 mm sigmacoated coverslip was removed from the top of the sample, and the sample was digested for 16 hours using a digestion buffer that contains 2 M NaCl at room temperature. Samples was expanded using 4× DI $H_2O$ washes, mounted on top of polylysine-coated slides, and imaged post-expansion. FIG. 10A (lower image) shows an expanded (4.58×) image of a Lamin A immunolabeled hMSC that is grown on top of a proteolytically degradable hydrogel. For both pre- and post-expansion images, LSM 710 NLO (Carl Zeiss) confocal microscope with a 20× N.A. 1.0 water objective, a pinhole of 1 Airy Unit and with Nyquist sampling were used. FIG. 10B, which shows the representative intensity line scans and their Gaussian approximation of intra-nuclear lamin A channels, illustrating that GtG allows one to resolve the average diameter of these channels in cells cultured on biomaterials.

Example 9—A Protocol for Expanding a Sample of Interest Encapsulated in Three-Dimensional (3D) Degradable Biomaterials Apart from 2D cultures of cells on biomaterials, 3D encapsulation and growth of biological samples of interest in biomaterials are extensively used to study biology, as they are often proposed as more relevant in vitro models of the ECM compared to 2D surfaces, since most of the cells, organs and tissues are surrounded by a 3D matrix in vivo.

A strategy to expand a sample of interest cultured on two-dimensional biomaterial is as follows:

i) Encapsulation and culturing of the biological sample of interest in the degradable biomaterial, ii) fixing the sample of interest, iii) anchoring the sample of interest with an anchoring group, iv) permeating the biomaterial with the PhotoExM gel solution twice, v) removing most of the excess gel solution, and putting a non-sticking, transparent and flat substrate (e.g. Sigmacoated glass) on top of the biomaterial to confine the PhotoExM gel only to the inside and the surface of the biomaterial, vi) photopolymerizing the PhotoExM gel, viii) digestion of the sample of interest, vii) degradation of the biomaterial, which can be carried out simultaneously with the previous digestion step, viii) expansion of the PhotoExM by repeated $H_2O$ washes.

Apart from synthetic biomaterials that are used to culture biological samples of interest, there is plethora of natural biomaterials that are permissive towards the culture and growth of biological samples. Herein, successful expansion and imaging of in vitro grown intestinal organoids starting from single intestinal stem cells grown in basement membrane matrix secreted from mouse osteosarcoma cells (e.g. Matrigel), that is extensively used to culture biological samples, is demonstrated.

To demonstrate the feasibility of GtG by using 3D biomaterials, single intestinal stem cells were encapsulated and intestinal organoids were grown in matrigel. [Gjorevski, N. et al. Designer matrices for intestinal stem cell and organoid culture. *Nature* 539, 560-564 (2016)] The matrigel thickness was chosen to be 400 μm. Intestinal organoids were fixed and immunolabeled for E-cadherin (primary antibody: CST, 24E10, 1:100) and secondary antibody: goat-anti-rabbit alexafluor594 plus, 1:250). Organoids in matrigel were first imaged before expansion, and a representative image is shown in FIG. 11A. Next, the samples were treated with 0.1 mg/mL AcX for 6 hours, washed 3× with PBS and permeated twice with a PhotoExM formulation comprised of 0.875 wt % PEG-diacrylamide, 6 wt % 8-arm, 10000 g/mol PEG-SH, 16 wt % sodium acrylate, 3 wt % acrylamide and 0.1 wt % LAP (Formulation B1, Table 2, below) in PBS with 2 M NaCl for 30 minutes each. Following the second wash, the remaining liquid was wicked using a chemwipe, a 12 mm sigmacoated coverslip was put on top of the gel and PhotoExM gels were formed by 365 nm light irradiation for 1 minutes at 4.5 $mW/cm^2$ intensity. The sample was digested for 48 hours using digestion buffer at room temperature, and fresh digestion buffer was added every 24 hours. Samples was expanded using 4× DI $H_2O$ washes, stained with DAPI (1:500) for 1 hour, washed 3-more times with DI $H_2O$ (10 min. each) and mounted on top of polylysine coated slides, and imaged post-expansion. Average sample expansion was calculated to be 4.3× (FIG. 10B). FIG. 11C shows an expanded image of an E-cadherin immunolabeled intestinal organoid with and without DAPI that is grown in matrigel. For both pre- and post-expansion images, LSM 710 NLO (Carl Zeiss) confocal microscope with a 20× N.A. 1.0 water objective, a pinhole of 1 Airy Unit and with Nyquist sampling were used.

While PhotoExM enables 3-7× fold improvement of the sample resolution in a conventional confocal microscope, these expansion factors are not sufficient to carry out single-molecule resolution. Single molecule resolution is typically achieved by various super-resolution techniques, such as STORM and PALM. [Huang, B., Bates, M. & Zhuang, X. Super-Resolution Fluorescence Microscopy. *Annu. Rev. Biochem.* 78, 993-1016 (2009)] These techniques, however, rely on laborious sample preparation, very high number of acquisitions, and show depth-dependent image acquisition due to the scattering and absorption of thick, opaque samples (e.g. tissues).

In additional novel aspects the present invention provides a strategy that allows the iterative expansion of a biological sample of interest labeled with commercially available, conventional materials (e.g. fluorophore conjugated antibodies) using photopolymerizable hydrogels, in which we referred to as photo-iterative expansion microscopy (PhotoiExM). One important feature of the PhotoiExM is the introduction of a "transfer group" to the photopolymerizable hydrogel solution. Upon light irradiation, transfer group undergoes a reversible exchange reaction with another component of the photopolymerizable hydrogel, and thus transferring the material from one gel to another, while preserving the spatial location of the biological cue of interest. Furthermore, PhotoiExM has all of the advantages of photopolymerization in general (timing, kinetics, spatial location), and specific type of photopolymerizations, such as thiol-acrylate photopolymerization (oxygen insensitivity, rapid kinetics), as described in the previous examples. The overall concept of PhotoiExM is illustrated in FIG. 12.

The transfer groups can be comprised of an allyl-sulfide group, which undergo an extremely efficient, reversible and repeatable radical mediated exchange reaction with a thiol-group (FIG. 12, bottom, left). [Kloxin, C. J., Scott, T. F. & Bowman, C. N. Stress relaxation via addition-fragmentation chain transfer in a thiol-ene photopolymerization. *Macromolecules* 42, 2551-2556 (2009); Brown, T. E., Marozas, I. A. & Anseth, K. S. Amplified Photodegradation of Cell-Laden Hydrogels via an Addition-Fragmentation Chain Transfer Reaction. *Adv. Mater. Deerfield Beach Fla* 29, (2017)] The radical generation can be achieved by light irradiation, and since PhotoExM hydrogel formulations are already comprised of thiol-groups (CTA), a photochemical strategy as disclosed above from PhotoExM is compatible with PhotoiExM as well, which simplifies the design. Furthermore, this means that PhotoiExM can be used to expand a sample of interest either x-fold or $x^n$-fold depending on the requirement using an identical chemical strategy and starting with commercially available labelling strategies, where n denotes the number of iterations.

Allyl sulfide groups can be introduced either as a cross-linker monomer, as a separate monomer, or as a mixed thiol/allyl-sulfide transfer monomer, which can be in situ prepared with reacting a multi-arm thiol with an allyl-sulfide containing small molecule in the presence of light and a photoinitiator. The latter strategy is more attractive, as it is more demanding to synthesize an allyl-sulfide crosslinker or a monomer compared to a small-molecule allyl-sulfide. Then, this in situ generated transfer monomer can be mixed with the remaining components of the PhotoExM formulation, and upon light irradiation, the first hydrogel with allyl-sulfide groups can be formed. This strategy is schematically illustrated in FIG. 13.

A strategy of PhotoiExM to iteratively enlarge a biological sample of interest is demonstrated. The strategy involves (i) fixing, labelling and anchoring a biological sample of interest, (ii) in situ generation of the allyl sulfide containing transfer monomer by reacting with a multi-arm thiol, (iii) mixing the transfer monomer with the other components of the PhotoExM formulations (crosslinker, photoinitiator, electrolyte monomer, CTA, plasticizing monomer), which we will refer to as PhotoiExM formulation (iv) permeating the biological sample of interest with the PhotoiExM formulation (v) forming the PhotoiExM hydrogel with light irradiation (vi) digesting the biological sample of interest, (vii) expanding the PhotoiExM hydrogel, (viii) permeating the PhotoiExM hydrogel with a solution containing a multi-arm thiol CTA and photoinitiator (thiol permeating step), (ix) irradiating the PhotoiExM hydrogel to introduce excess thiols, (x) permeating the PhotoiExM hydrogel with a "template hydrogel" solution, (xi) forming an interpenetrating network of the template hydrogel within PhotoiExM hydrogel by light irradiation, (xiii) permeating the interpenetrating network with a solution containing a multi-arm thiol CTA and photoinitiator (thiol permeating step), (xiv) irradiating the PhotoiExM hydrogel to introduce excess thiols, (xv) permeating the interpenetrating network with the PhotoExM or PhotoiExM formulation, (xvi) simultaneously polymerizing this newly permeated network ($PhotoiExM_2$) while transferring the material of the first network to the newly permeated network by light irradiation, (xvii) degradation of the template network, (xviii) expansion of the ($PhotoiExM_2$) network. The steps between (viii) and (xviii) represent an iteration step(s), which can be repeated indefinitely to expand a biological sample of interest $x^n$ times, where x is the expansion of a single step and n is the number of iterations.

Figure 1:
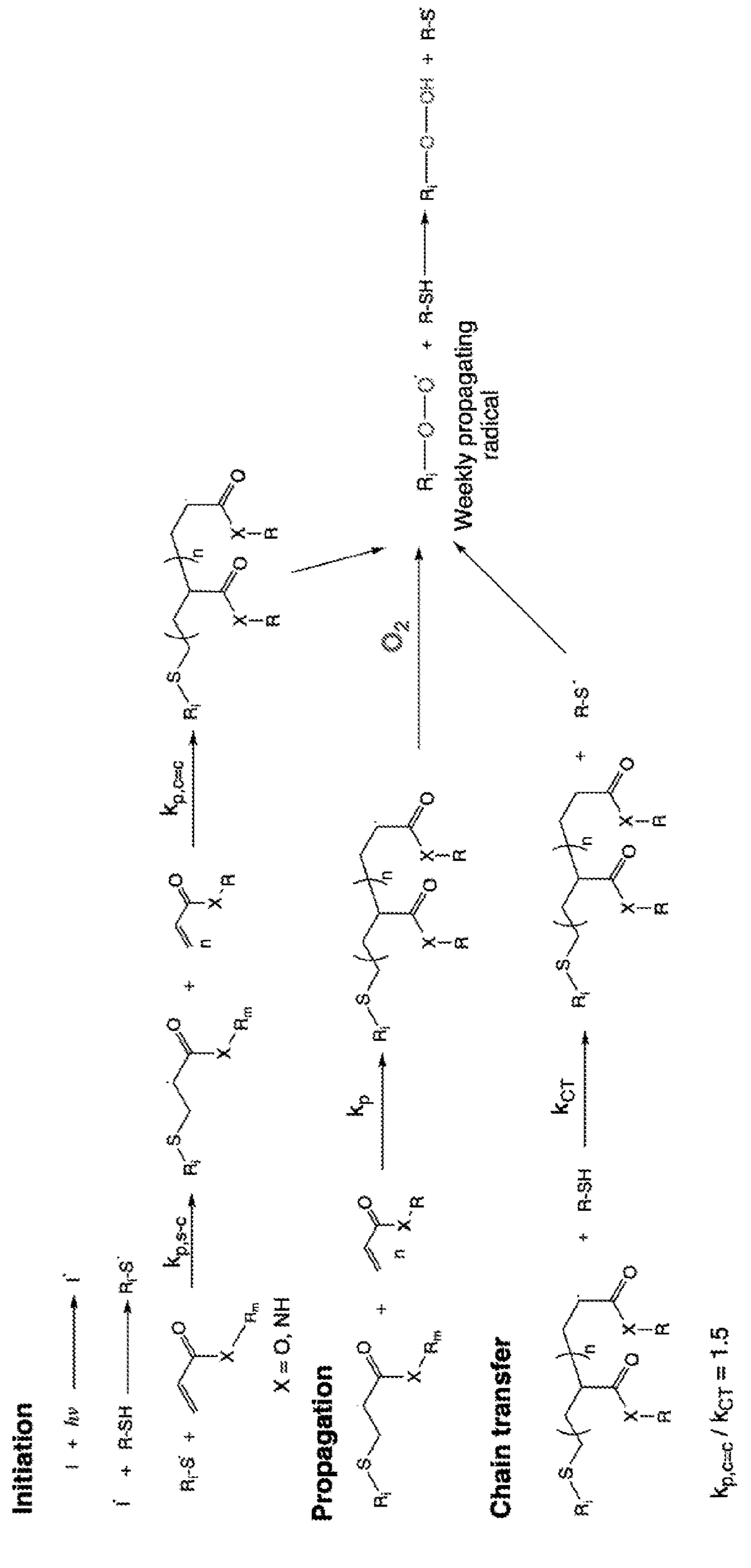
FIG. 1 is a schematic showing the mechanism of thiol acrylate photopolymerization. In the initiation step, radicals formed via photoinitiation abstract a hydrogen from thiol chain transfer agents (CTA), resulting in a thiyl radical. Subsequently, the thiyl radical reacts with the acrylate bond to initiate polymerization. Propagation takes place via a chain-growth mechanism. However, simultaneous to the propagation, propagating acryloyl radicals can abstract a hydrogen from a thiol group to form a thiyl radical that can reinitiate the propagation of new polymer chains. Therefore, a single radical can initiate multiple chains before termination, leading to extremely fast polymerization and gelation kinetics. Secondly, in the presence of oxygen, formed end-group peroxide radicals can still abstract a hydrogen from the thiol group, and the formed thiyl radicals can continue initiating new chains. This mechanism effectively minimizes polymerization termination by oxygen inhibition in thiol-acrylate photopolymerizations.

In the strategy above, following the formation of each new hydrogel, whether a PhotoiExM or a template hydrogel, excess thiol groups are introduced into the hydrogels, as described in steps (viii), (ix) and (xiii), (xiv). This so called "thiol permeating step" is important for preserving the concentration of allyl-sulfide groups, because, in the absence of excess thiols, radicals propagating the polymer chains can be transferred to the allyl-sulfide groups and irreversibly deactivate it. This in turn, would prevent the transfer of one network to another, and therefore, would prevent iterative expansion of the biological samples of interest. By introducing an excess of thiols before each gel formation step, the probability of propagating radicals deactivating allyl-sulfide groups is decreased by increasing the probability of them abstracting a hydrogen from a thiol group to form a thiyl radical, which further feed the thiol-acrylate photopolymerization (FIG. 1). The mixture used for the thiol permeating step is referred to as "thiol-mix" and a model composition of this thiol-mix is provided in Table 5, below.

In the strategy above, the template hydrogel is a hydrolytically degradable network that prevents the shrinkage of the PhotoiExM hydrogel during its permeating with a new solution of PhotoExM or PhotoiExM hydrogel in the next steps. Since an expanded PhotoiExM hydrogel is comprised of completely dissociated electrolyte monomer, introduction of non-dissociated electrolytes (e.g. sodium acrylate in PhotoExM gel solution, buffer salts) would result in immediate shrinkage of the first gel, rendering iterative expansion unfeasible. A model composition of a template hydrogel is provided in Table 6, below. This template hydrogel contains a hydrolytically degradable crosslinking monomer (e.g. PEG-diacrylamide), which can be degraded by treatment with an acidic or basic aqueous solution following before the iterative expansion of the hydrogel.

In the example below, a strategy for PhotoiExM to iteratively enlarge a sample of interest is presented. Herein, a sample of interest generally includes a biological, chemical or biochemical sample, such as a cell, array of cells, tumor, tissue, cell isolate, biochemical assembly, or a distribution of molecules suitable of microscopic analysis. Furthermore, PhotoiExM is also compatible with GtG, indicating that sample of interest could be cultured on or encapsulated in a degradable biomaterial.

Example 10—General Strategy for PhotoiExM to Iteratively Enlarge a Sample of Interest Biological samples can be fixed, immunolabeled and anchored using 0.1 mg/ml AcX as demonstrated in any of the previous nine examples. First, for the preparation of the transfer monomer, 10 μl of 100 mM stock solution of allyl sulfide $PEG_3$ bis azide in DMSO is mixed with 20 μl of 25 wt % of CTA in PBS or in PBS with 2M NaCl, which provides a 4:1 stoichiometric ratio between SH and allyl sulfide groups. Herein, CTA is either a 4-arm, 5000 g/mol PEG-SH or a 8-arm, 10000 g/mol PEG-SH. This mixture is sonicated for 1 minutes until the solution becomes clear, and 2.5 μl of 2 wt % LAP and 17.5 μl of PBS or PBS with 2 M NaCl is added. This mixture is irradiated for 60 seconds at 4.5 mW/cm$^2$ light using 365 nm light to prepare the in situ allyl sulfide containing transfer monomer.

In the next step, PhotoiExM formulation was prepared as described in Table 7, below. An exemplary PhotoiExM composition is composed of 16 wt % sodium acrylate, 6 wt % CTA, 3 wt % acrylamide, 0.75-1.25 wt % PEG-diacrylamide, 0.1 wt % LAP and 1 wt % transfer monomer. This formulation is permeated in the sample of interest for 10 minutes to 6 hours depending on the thickness of the sample, and PhotoiExM hydrogels can be formed by irradiation for 60 seconds at 4.5 mW/cm$^2$ light using 365 nm light. The biological sample can be digested with digestion buffer for 16 to 72 hours, depending on the thickness of the sample, and with 4× $H_2O$ washes, the sample can be expanded 3-7× based on the concentration of PEG-diacrylamide and the CTA used.

In the next step (the thiol permeating step), this hydrogel is permeated twice with the thiol-mix (Table 5, below). Briefly, this mixture is composed of 6 wt % thiol-containing CTA and 0.1% LAP in $H_2O$. Each of the permeation steps can be between 10 minutes to 6 hours based on the sample thickness. Next, the excess liquid is wicked from the PhotoiExM hydrogel and excess thiols are introduced by irradiation for 15 seconds at 4.5 mW/cm$^2$ light using 365 nm light.

In the next step, the excess thiol containing PhotoiExM hydrogel is permeated twice with the template gel formulation (Table 6, below). Briefly, this formulation is composed of 10 wt % acrylamide, 6 wt % CTA, 1 wt % PEG-diacrylate and 0.1% LAP $H_2O$. Each of the permeation steps can be between 10 minutes to 6 hours based on the sample thickness. Next, the excess liquid is wicked from the PhotoiExM hydrogel and a Sigmacoated coverslip is introduced to the top of the hydrogel to confine the template gel to the dimension of the PhotoiExM gel. Template hydrogel is formed by irradiation for 60 seconds at 4.5 mW/cm$^2$ light using 365 nm light, resulting in an interpenetrating network (IPN). The sigmacoated coverslip is removed from the top of the IPN.

In the next step, this IPN is permeated twice with the thiol-mix (Table 5, below) using the identical procedure described in the thiol-permeating step.

In the next step, excess thiol containing IPN is permeated twice with one of the disclosed PhotoExM gel formulations (see e.g. tables 1-4, below). Each of the permeation steps can be between 10 minutes and 6 hours based upon factors including the sample thickness. Next, the excess liquid is wicked from the PhotoiExM hydrogel and a Sigmacoated coverslip is introduced to the top of the hydrogel to confine the template gel to the dimension of the PhotoiExM gel. Simultaneous formation of the second PhotoExM hydrogel, and transfer of the material of the first PhotoiExM hydrogel to this hydrogel is achieved by irradiation for 60 seconds at 4.5 mW/cm$^2$ light using 365 nm light. The sigmacoated coverslip is removed from the top of the hydrogel.

Next, the template hydrogel is degraded with a 1 to 6-hour treatment with an aqueous solution of 0.1 M sodium hydroxide (NaOH). Finally, the hydrogel is further expanded with 4× washes in DI $H_2O$, 30 minutes each, which can result in a further 3-7× expansion of the sample, leading to an overall expansion 9-49× depending on the on the concentration of PEG-diacrylamide and the CTA used.

As an example of use of PhotoiExM to enlarge a sample of interest, FIG. 14A shows the representative image of a 13-15× expanded C2C12 cells immunolabeled with α-tubulin. At this expansion, intensity line scans of the single microtubules can be better approximated by two Gaussian curves, indicating that PhotoiExM enables resolving the hollow structure of microtubules, which are known to be 24-27 nm in diameter. This is not feasible with a single expansion, and a typical line scan only provides a single Gaussian approximation. FIG. 14B shows the representative image of a 16-20× expanded C2C12 cells immunolabeled with α-tubulin during a cell division. Herein, the area marked with a rectangle shows a centriole, which are approximately 250 nm in diameter, which can be useful as a benchmark to calculate resolution in PhotoiExM.

TABLE 1

Formulation A.

| Formulation A | wt % | wt % stock | μL/100 μL gel |
|---|---|---|---|
| Sodium acrylate | 16 | 33 | 48.5 |
| Acrylamide | 3 | 40 | 7.5 |
| 4-arm, 5000 g/mol PEG-SH | 6 | 25 | 24.0 |
| LAP | 0.1 | 2 | 5 |
| PEG-bisacrylamide ($M_w$ = 600 g/mol) | 1.25 | 25 | 5 |
| PBS + 2M NaCl or PBS only | | | 10 |

All of the components were prepared in phosphate buffered saline (PBS) or PBS with 2M NaCl at pH 7.4.

TABLE 2

Formulation B1.

| Formulation B1 | wt % | wt % stock | μL/100 μL gel |
|---|---|---|---|
| Sodium acrylate | 16 | 33 | 48.5 |
| Acrylamide | 3 | 40 | 7.5 |
| 8-arm, 10000 g/mol PEG-SH | 6 | 25 | 24.0 |
| LAP | 0.1 | 2 | 5 |
| PEG-bisacrylamide ($M_w$ = 600 g/mol) | 0.875 | 25 | 3.5 |
| PBS + 2M NaCl or PBS only | | | 11.5 |

All of the components were prepared in phosphate buffered saline (PBS) or PBS with 2M NaCl at pH 7.4.

TABLE 3

| Formulation B2. | | | |
|---|---|---|---|
| Formulation B2 | wt % | wt % stock | μL/100 μL gel |
| Sodium acrylate | 16 | 33 | 48.5 |
| Acrylamide | 3 | 40 | 7.5 |
| 8-arm, 10000 g/mol PEG-SH | 6 | 25 | 24.0 |
| LAP | 0.1 | 2 | 5 |
| PEG-bisacrylamide ($M_w$ = 600 g/mol) | 1.25 | 25 | 5 |
| PBS + 2M NaCl or PBS only | | | 10 |

All of the components were prepared in phosphate buffered saline (PBS) or PBS with 2M NaCl at pH 7.4.

TABLE 4

| Formulation B3. | | | |
|---|---|---|---|
| Formulation B3 | wt % | wt % stock | μL/100 μL gel |
| Sodium acrylate | 16 | 33 | 48.5 |
| Acrylamide | 3 | 40 | 7.5 |
| 8-arm, 10000 g/mol PEG-SH | 6 | 25 | 24.0 |
| LAP | 0.1 | 2 | 5 |
| PEG-bisacrylamide ($M_w$ = 600 g/mol) | 0.75 | 25 | 3 |
| PBS + 2M NaCl or PBS only | | | 12 |

All of the components were prepared in phosphate buffered saline (PBS) or PBS with 2M NaCl at pH 7.4.

TABLE 5

| Formulation of the thiol-mix. | | | |
|---|---|---|---|
| Thiol-mix | wt % | wt % stock | μL/100 μL gel |
| -arm, 5000 g/mol PEG-SH or 8-arm, 10000 g/mol PEG-SH | 6 | 25 | 24.0 |
| LAP | 0.1 | 2 | 5 |
| DI $H_2O$ | | | 71 |

All of the components were prepared in DI $H_2O$.

TABLE 6

| Formulation of the template hydrogel. | | | |
|---|---|---|---|
| Temolate hydrogel | wt % | wt % stock | μL/100 μL gel |
| Acrylamide | 10 | 40 | 25.0 |
| 4-arm, 5000 g/mol PEG-SH or 8-arm, 10000 g/mol PEG-SH | 6 | 25 | 24.0 |
| LAP | 0.1 | 2 | 5 |
| PEG-diacrylate ($M_w$ = 575 g/mol) | 1 | 25 | 4 |
| DI $H_2O$ | | | 42 |

All of the components were prepare in DI $H_2O$.

TABLE 7

| Formulation of the PhotoiExM hydrogel. | | | |
|---|---|---|---|
| PhotoiExM hydrogel | wt % | wt % stock | μL/100 μL gel |
| Sodium acrylate | 16 | 33 | 48.5 |
| Acrylamide | 3 | 40 | 7.5 |
| 4-arm, 5000 g/mol PEG-SH or 8-arm, 10000 g/mol PEG-SH. | 6 | 25 | 24.0 |
| LAP | 0.1 | 2 | 5 |
| PEG-bisacrylamide ($M_w$ = 600 g/mol) | 0.75-1.25 | 25 | 3-5 |
| Transfer monomer | 1 | 10 | 10-12 |

All of the components were prepared in phosphate buffered saline (PBS) or PBS with 2M NaCl at pH 7.4.

Definitions

As used throughout the entire application, the terms "a" ~ and "an" ~ are used in the sense that they mean "at least one", "at least a first", "one or more" or "a plurality" of the referenced components or steps, unless the context clearly dictates otherwise. For example, the term "a cell" includes a plurality of cells, including mixtures thereof.

The term "and/or" wherever used herein includes the meaning of "and", "or" and "all or any other combination of the elements connected by said term".

The term "about" or "approximately" as used herein means within 20%, preferably within 10%, and more preferably within 5% of a given value or range.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("M.") or weight average molecular weight ("M"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

As used herein, the term "comprising" is intended to mean that the products, compositions and methods include the referenced components or steps, but not excluding others. "Consisting essentially of" when used to define products, compositions and methods, shall mean excluding other components or steps of any essential significance. Thus, a composition consisting essentially of the recited components would not exclude trace contaminants and pharmaceutically acceptable carriers. "Consisting of" shall mean excluding more than trace elements of other components or steps. As used herein, the term "composition" is intended to encompass a product comprising the specified ingredients in the specified amounts, as well as any product which results, directly or indirectly, from combination of the specified ingredients in the specified amounts.

As used herein, the term "sample of interest" generally refers to, but not limited to, a biological, chemical or biochemical sample, such as a cell array of cells, tumor, tissue, cell isolate, biochemical assembly, or a distribution of molecules suitable for microscopic analysis.

In a preferred embodiment, the sample of interest can be labeled or tagged. Typically, the label or tag will bind chemically (e.g., covalently, hydrogen bonding or ionic bonding) to the sample, or a component thereof. The tag can be selective for a specific target (e.g., a biomarker or class of molecule), as can be accomplished with an antibody or other target specific binder. The tag preferably comprises a visible component, as is typical of a dye or fluorescent molecule. Contacting the sample of interest with a label or tag results in a "labeled sample of interest." A fluorescently labeled sample of interest, for example, is a sample of interest labeled through techniques such as, but not limited to, immunofluorescence, immunohistochemical or immunocytochemical staining to assist in microscopic analysis. Thus, the label or tag is preferably chemically attached to the sample of interest, or a targeted component thereof. In a preferred embodiment, the label or tag, e.g. the antibody and/or fluorescent dye, further comprises a physical, biological, or chemical anchor or moiety that attaches or crosslinks the sample to the composition, hydrogel or other swellable material. The labeled sample may furthermore include more than one label. For example, each label can have a particular or distinguishable fluorescent property, e.g., distinguishable excitation and emission wavelengths. Further, each label can have a different target specific binder that is selective for a specific and distinguishable target in, or component of the sample.

As used herein, the term "swellable material" generally refers to a material that expands when contacted with a liquid, such as water or other solvent. Preferably, the swellable material uniformly expands in 3 dimensions. Additionally, or alternatively, the material is transparent such that, upon expansion, light can pass through the sample. In one embodiment the swellable material is a swellable polymer or hydrogel. In one embodiment, the swellable material is formed in situ from precursors thereof.

In an embodiment, embedding the sample in a swellable material comprises permeating (such as, perfusing, infusing, soaking, adding or other intermixing) the sample with the swellable material, preferably by adding precursors thereof. Alternatively or additionally, embedding the sample in a swellable material comprises permeating one or more monomers or other precursors throughout the sample and polymerizing and/or crosslinking the monomers or precursors to form the swellable material or polymer. In this manner the sample of interest is embedded in the swellable material.

Thus, in an embodiment of the invention a sample of interest, or a labeled sample, is permeated with a composition comprising water soluble precursors of a water swellable material and reacting the precursors to form the water swellable material in situ.

As used herein, the "disruption of the endogenous biological molecules" of the sample of interest generally refers to the mechanical, physical, chemical, biochemical or, preferably, enzymatic digestion, disruption or break up of the sample so that it will not resist expansion. In an embodiment, a protease enzyme is used to homogenize the sample-swellable material complex. It is preferable that the disruption does not impact the structure of the swellable material but disrupts the structure of the sample. Thus, the sample disruption should be substantially inert to the swellable material. The degree of digestion can be sufficient to compromise the integrity of the mechanical structure of the sample or it can be complete to the extent that the sample-swellable material complex is rendered substantially free of the sample.

The sample-swellable material complex is then isotropically expanded. Preferably, a solvent or liquid is added to the complex, which is then absorbed by the swellable material and causes swelling. Where the swellable material is water-swellable, an aqueous solution can be used. Surprisingly, as the material swells isotropically, the anchored tags maintain their relative spatial relationship. The swollen material with the embedded sample of interest can be imaged on any optical microscope, allowing effective imaging of features below the classical diffraction limit.

In one embodiment, the chemical to anchor proteins directly to any swellable material is a succinimidyl ester of 6-((acryloyl)amino)hexanoic acid (acryloyl-X, SE; abbreviated "AcX"; Life Technologies). Treatment with AcX modifies amines on proteins with an acrylamide functional group.

Unless defined otherwise, all technical and scientific terms used herein have the same meaning as commonly understood by one of ordinary skill in the art (e.g., in cell culture, molecular genetics, nucleic acid chemistry, hybridisation techniques and biochemistry).

The preceding examples are provided for the purpose of illustration and are not intended to limit the scope of the present invention.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

All references cited in the present application are incorporated in their entirety herein by reference to the extent not inconsistent herewith.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for preparing a sample of interest for expansion microscopy comprising the steps of:

i. fixing a sample of interest;

ii. labelling a biological cue of interest within the sample of interest with one or more labelling groups;

iii. functionalizing the sample of interest with a tethering group;

iv. permeating the sample of interest with a swellable, photopolymerizable hydrogel solution;

v. polymerizing the hydrogel solution via light irradiation, thereby allowing it to embed and tether the sample of interest into a hydrogel network;

vi. digesting or removing the sample of interest with a solution using a digestion method that retains and preserves the spatial location of the labelling groups; and vii. expanding the hydrogel network by promoting the dissociation of electrolyte monomers by water exchange;

wherein the labelling groups are applied prior to the digesting step and remain associated with the tethered biological cue throughout the digesting step and the expanding step, without removal and re-application of the labelling groups after digestion.

2. The method for preparing a sample of interest for expansion microscopy according to claim 1 further comprising the step of imaging the expanded polymerized hydrogel after the expanding step.

3. The method for preparing a sample of interest for expansion microscopy according to claim 1 wherein the swellable, photopolymerizable hydrogel solution comprises a photoinitiator, a crosslinking monomer, an electrolyte monomer, a chain transfer agent and a plasticizing monomer.

4. The method for preparing a sample of interest for expansion microscopy according to claim 3 wherein LAP is the photoinitiator.

5. The method for preparing a sample of interest for expansion microscopy according to claim 1 wherein light irradiation is performed with a wavelength between about 300 to about 450 nm.

6. The method for preparing a sample of interest for expansion microscopy according to claim 1 wherein light irradiation is performed with a wavelength between about 365 to about 410 nm.

7. The method for preparing a sample of interest for expansion microscopy according to claim 1 wherein irradiation time is between about 20 seconds to about 10 minutes.

8. The method for preparing a sample of interest for expansion microscopy according to claim 1 wherein irradiation time is between about 30 seconds to about 2 minutes.

9. The method for preparing a sample of interest for expansion microscopy according to claim 1 wherein irradiation intensity is between about 1 to about 50 $mW/cm^2$.

10. The method for preparing a sample of interest for expansion microscopy according to claim 1 wherein irradiation intensity is between about 2.5 to about 10 $mW/cm^2$.

* * * * *